US011943375B2

(12) United States Patent
Kempf et al.

(10) Patent No.: US 11,943,375 B2
(45) Date of Patent: Mar. 26, 2024

(54) METHOD AND APPARATUS FOR MANAGING CLOUD SERVICES USING SMART CONTRACTS AND BLOCKCHAINS IN A FEDERATION OF CLOUD PROVIDERS

(71) Applicant: Telefonaktiebolaget LM Ericsson (publ), Stockholm (SE)

(72) Inventors: James Kempf, Mountain View, CA (US); Mukesh Thakur, Espoo (FI); Tomas Mecklin, Kyrkslätt (FI); Nanjangud Chandrasekhara Swamy Narendra, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 482 days.

(21) Appl. No.: 17/257,258

(22) PCT Filed: Jul. 9, 2018

(86) PCT No.: PCT/SE2018/050751
§ 371 (c)(1),
(2) Date: Dec. 30, 2020

(87) PCT Pub. No.: WO2020/013738
PCT Pub. Date: Jan. 16, 2020

(65) Prior Publication Data
US 2021/0281428 A1 Sep. 9, 2021

(51) Int. Cl.
*H04L 9/32* (2006.01)
*G06F 16/27* (2019.01)
(Continued)

(52) U.S. Cl.
CPC ............ *H04L 9/3265* (2013.01); *G06F 16/27* (2019.01); *H04L 67/53* (2022.05); *H04L 67/562* (2022.05); *H04L 9/50* (2022.05)

(58) Field of Classification Search
CPC ..... H04L 9/3265; H04L 67/53; H04L 67/562; H04L 9/50; H04L 9/3239; H04L 9/3247;
(Continued)

(56) References Cited

U.S. PATENT DOCUMENTS 8,978,122 B1   3/2015 Zolfonoon et al.
10,567,234 B1 * 2/2020 Todd ...................... H04L 67/10
(Continued)

FOREIGN PATENT DOCUMENTS

WO        2017/136643 A1      8/2017

OTHER PUBLICATIONS

Alex, "Blockchain Single Sign On", Available Online at <https://spinbackup.com/blog/blockchain-single-sign-on/>, Retrieved on Mar. 18, 2021, Dec. 6, 2018, pp. 1-8.
(Continued)

*Primary Examiner* — Bruce S Ashley
(74) *Attorney, Agent, or Firm* — NICHOLSON DE VOS WEBSTER & ELLIOTT LLP

(57) ABSTRACT

A first data center receives a request, from a tenant, to access a first service. Responsive to determining that the tenant is not associated with a delegation contract, the first data center records a delegation contract for the tenant. A second data center receives a request, from the tenant, to access a second service, where the second data center is physically separate from the first data center. Responsive to determining that the tenant is associated with the delegation contract recorded in the blockchain database, the second data center causes an update of the delegation contract in the blockchain database; causes the second service to provide access to the tenant; transmits, to the tenant, a confirmation that the second service can be accessed, and transmits an update to the first data center indicating that the delegation contract has been updated to include a second service offer.

18 Claims, 14 Drawing Sheets

(51) Int. Cl.
*H04L 9/00* (2022.01)
*H04L 67/53* (2022.01)
*H04L 67/562* (2022.01)

(58) Field of Classification Search
CPC ..... H04L 9/3297; G06F 16/27; G06F 21/604; G06F 21/64; G06F 9/5072
See application file for complete search history.

(56) References Cited

U.S. PATENT DOCUMENTS

| | | | |
|---|---|---|---|
| 11,012,237 B1* | 5/2021 | Sarda | H04L 9/3247 |
| 2014/0074539 A1 | 3/2014 | Doering et al. | |
| 2018/0063143 A1 | 3/2018 | Wilson et al. | |
| 2019/0095516 A1* | 3/2019 | Srinivasan | H04L 63/102 |
| 2019/0334920 A1* | 10/2019 | Kelly | H04L 9/3239 |

OTHER PUBLICATIONS

Baars, Djuri, "Towards Self-Sovereign Identity using Blockchain Technology", Rabobank, University of Twente, 2016, 90 pages.
International Preliminary Report on Patentability, PCT App. No. PCT/SE2018/050751, dated Jan. 21, 2021, 11 pages.
International Search Report and Written Opinion, PCT App. No. PCT/SE2018/050751, dated Apr. 10, 2019, 14 pages.
Myrto, Galenianou, "Federated Consensus Protocols", National Kapodistrian University of Athens, Graduate Program of Logic, Algorithms and Computations Department of Mathematics, https://chain.com/docs/1.2/protocol/papers/federated-consensus, 2017, 38 pages.
Nayak et al., "Saranyu: Using Smart Contracts and Blockchain for Cloud Tenant Management", 2018 IEEE 11th International Conference on Cloud Computing, IEEE, 2018, pp. 857-861.
Schiavo et al., "FaaS: Federation-as-a-Service: The SUNFISH Cloud Federation Solution", Technical Report, Secure Information Sharing in Federated Heterogeneous Private Clouds (SUNFISH), Grant Agreement No. 6446662020, Dec. 2016, pp. 1-56.
Sette et al., "Authorization Policy Federation in Heterogeneous Multicloud Environments", IEEE Cloud Computing, IEEE, Jul./Aug. 2017, pp. 38-47.
Xiang et al., "JCLedger: A Blockchain Based Distributed Ledger for JointCloud Computing", 2017 IEEE 37th International Conference on Distributed Computing Systems Workshops, IEEE, 2017, pp. 289-293.
Zyskind et al., "Decentralizing Privacy: Using Blockchain to Protect Personal Data," 2015 IEEE Security and Privacy Workshops, 2015, pp. 180-184.
Extended European Search Report, EP App. No. 18925867.6, dated Jan. 18, 2022, 9 pages.
First Office Action including Search Report, CN App. No. 201880097342.6, dated May 11, 2023, 9 pages of Original Document Only.
First Office Action including Search Report, CN App. No. 201880097342.6, dated May 11, 2023, 11 pages (2 pages of English Translation and 9 pages of Original Document).
Second Office Action, CN App. No. 201880097342.6, dated Jan. 24, 2024, 7 pages (4 pages of English Translation and 3 pages of Original Document).

* cited by examiner

```
┌─────────────────────────────────────────────────────────────────────────────┐
│ RECEIVE, AT A FIRST SERVER OF THE FIRST DATA CENTER, A REQUEST, FROM A      │
│ TENANT, TO ACCESS A FIRST SERVICE HOSTED IN THE FIRST DATA CENTER, WHERE    │
│ THE TENANT IS ASSOCIATED WITH A UNIQUE PAIR OF CRYPTOGRAPHIC TENANT         │
│ PRIVATE KEY AND TENANT PUBLIC KEY                                           │
│                                    802                                       │
└─────────────────────────────────────────────────────────────────────────────┘
                                     │
                                     ▼
┌─────────────────────────────────────────────────────────────────────────────┐
│ RESPONSIVE TO DETERMINING THAT THE TENANT IS NOT ASSOCIATED WITH A          │
│ DELEGATION CONTRACT RECORDED IN A BLOCKCHAIN DATABASE INDICATING THAT THE   │
│ TENANT IS ENROLLED TO USE ONE OR MORE SERVICES HOSTED ON SERVERS OF THE     │
│ FEDERATION OF CLOUD PROVIDERS, RECORD A DELEGATION CONTRACT INCLUDING AT    │
│ LEAST AN IDENTIFICATION OF THE FIRST SERVICE HOSTED ON THE FIRST DATA       │
│ CENTER, AN IDENTIFICATION OF THE TENANT, AND A FIRST SERVICE OFFER THAT IS  │
│ CRYPTOGRAPHICALLY SIGNED BY THE TENANT AND BY THE FIRST SERVICE, WHERE      │
│ THE FIRST SERVICE OFFER INDICATES THAT THE TENANT IS ENROLLED TO USE THE    │
│ FIRST SERVICE                                                               │
│                                    804                                       │
└─────────────────────────────────────────────────────────────────────────────┘
                                     │
                                     ▼
┌─────────────────────────────────────────────────────────────────────────────┐
│ RECEIVE, AT A SECOND SERVER OF THE SECOND DATA CENTER, A REQUEST, FROM A    │
│ TENANT, TO ACCESS A SECOND SERVICE HOSTED IN THE SECOND DATA CENTER,        │
│ WHERE THE SECOND DATA CENTER IS PHYSICALLY SEPARATE FROM THE FIRST DATA     │
│ CENTER                                                                      │
│                                    806                                       │
└─────────────────────────────────────────────────────────────────────────────┘
                                     │
                                     ▼
┌─────────────────────────────────────────────────────────────────────────────┐
│ RESPONSIVE TO DETERMINING THAT THE TENANT IS ASSOCIATED WITH THE DELEGATION │
│ CONTRACT RECORDED IN THE BLOCKCHAIN DATABASE INDICATING THAT THE TENANT IS  │
│ ENROLLED TO USE ONE OR MORE SERVICES HOSTED ON SERVERS OF THE FEDERATION    │
│ OF CLOUD PROVIDERS, PERFORM THE FOLLOWING                                   │
│                                    808                                       │
│  ┌───────────────────────────────────────────────────────────────────────┐  │
│  │ CAUSE AN UPDATE OF THE DELEGATION CONTRACT IN THE BLOCKCHAIN DATABASE │  │
│  │ TO INCLUDE AN IDENTIFICATION OF THE SECOND SERVICE, AND A SECOND     │  │
│  │ SERVICE OFFER THAT IS CRYPTOGRAPHICALLY SIGNED BY THE TENANT AND BY  │  │
│  │ THE SECOND SERVICE, WHERE THE SECOND SERVICE OFFER INDICATES THAT    │  │
│  │ THE TENANT IS ENROLLED TO USE THE SECOND SERVICE                     │  │
│  │                                810                                    │  │
│  └───────────────────────────────────────────────────────────────────────┘  │
│                                     │                                        │
│                                     ▼                                        │
│  ┌───────────────────────────────────────────────────────────────────────┐  │
│  │ CAUSE THE SECOND SERVICE TO PROVIDE ACCESS TO THE TENANT BASED ON    │  │
│  │ THE SECOND SERVICE OFFER                                              │  │
│  │                                812                                    │  │
│  └───────────────────────────────────────────────────────────────────────┘  │
│                                     │                                        │
│                                     ▼                                        │
│  ┌───────────────────────────────────────────────────────────────────────┐  │
│  │ TRANSMIT, TO THE TENANT, A CONFIRMATION THAT THE SECOND SERVICE CAN  │  │
│  │ BE ACCESSED BASED ON THE SECOND SERVICE OFFER                         │  │
│  │                                814                                    │  │
│  └───────────────────────────────────────────────────────────────────────┘  │
│                                     │                                        │
│                                     ▼                                        │
│  ┌───────────────────────────────────────────────────────────────────────┐  │
│  │ TRANSMIT AN UPDATE TO THE FIRST DATA CENTER INDICATING THAT THE      │  │
│  │ DELEGATION CONTRACT HAS BEEN UPDATED TO INCLUDE THE SECOND SERVICE   │  │
│  │ OFFER                                                                 │  │
│  │                                816                                    │  │
│  └───────────────────────────────────────────────────────────────────────┘  │
└─────────────────────────────────────────────────────────────────────────────┘
```

Fig. 8

METHOD AND APPARATUS FOR MANAGING CLOUD SERVICES USING SMART CONTRACTS AND BLOCKCHAINS IN A FEDERATION OF CLOUD PROVIDERS

CROSS-REFERENCE TO RELATED APPLICATIONS

This application is a National stage of International Application No. PCT/SE2018/050751, filed Jul. 9, 2018, which is hereby incorporated by reference.

TECHNICAL FIELD

Embodiments of the invention relate to the field of distributed cloud services; and more specifically, to the management of cloud services using smart contracts and blockchains in a federation of cloud providers.

BACKGROUND ART

A multi-tenant data center infrastructure supports one or multiple services that are made available to users by a cloud service provider. The services hosted in a data center of a cloud provider can include Infrastructure as a Service (IaaS), which provides access to computing resources (e.g., processing power, data storage capacity, and networking resources); Platform as a Service (PaaS), which provides a development platform layer (e.g., web servers, database management systems, and software development kits (SDKs)) in addition to computing and storage infrastructure; and Software as a Service (SaaS), which provides application-level services tailored to a range of business needs.

A cloud federation is a set of cloud service providers that collaborate to provides a set of services to tenants to achieve a business goal. Within a cloud federation, the individual cloud service providers can share resources, data and services. Tenants may obtain multiple services via the cloud federation. For example, the cloud federation can collectively provide compute, network, and storage services. Each cloud provider from the federation provides a subset of services. In a federation of cloud providers, the cloud providers need to federate the tenant identity management, authentication, and authorization systems. In addition, charging for the services consumed needs to proceed through a centralized settlement agency.

In existing service cloud provider platforms, each cloud service provider runs an independent tenant and service management system. For example, each cloud provider may run the tenant and service management system based on a centralized database (e.g., relational database system) or based on a permissioned blockchain platform. In these systems each tenant has different accounts with the different cloud providers. For tenants to seamlessly access the different services from the multiple cloud providers of the federation, there needs to be a translation between the multiple tenant and service management systems of the different cloud providers.

It is complex, time consuming and expensive to have independent tenant and service management systems to manage tenants and services in a federation of cloud providers. To enable the tenants to access the different cloud providers of the federation, the tenants are required to use different single sign-on protocols. In addition, the centralized settlement agency introduces a friction point into transactions and requires an additional step in charging. The charging settlement agency as well as the cloud services providers might manipulate charging data for their benefits. Therefore, there is also trust issue between the different cloud service providers. Moreover, the use of independent tenant and service management systems is not scalable and if more tenants and services join the federation of cloud service providers, the different tenant and service management systems become more complex to build and maintain.

SUMMARY OF THE INVENTION

One general aspect includes a method in a federation of cloud providers including at least a first data center and a second data center, where the first data center is operated by a first cloud provider and the second data center is operated by a second cloud provider that is different from the first cloud provider, the method including: receiving, at the first data center, a request, from a tenant, to access a first service hosted in the first data center, where the tenant is associated with a unique pair of cryptographic tenant private key and tenant public key; responsive to determining that the tenant is not associated with a delegation contract recorded in a blockchain database, recording a delegation contract including at least an identification of the first service hosted on the first data center, an identification of the tenant, and a first service offer that is cryptographically signed by the tenant and by the first service, where the first service offer indicates that the tenant is enrolled to use the first service; receiving, at the second data center, a request, from the tenant, to access a second service hosted in the second data center, where the second data center is physically separate from the first data center; and responsive to determining that the tenant is associated with the delegation contract recorded in the blockchain database indicating that the tenant is enrolled to use one or more services hosted on servers of the federation of cloud providers, performing the following. The method also includes causing an update of the delegation contract in the blockchain database to include an identification of the second service and a second service offer that is cryptographically signed by the tenant and by the second service, where the second service offer indicates that the tenant is enrolled to use the second service. The method also includes causing the second service to provide access to the tenant based on the second service offer. The method also includes transmitting, to the tenant, a confirmation that the second service can be accessed based on the second service offer. The method also includes transmitting an update to the first data center indicating that the delegation contract has been updated to include the second service offer.

One general aspect includes a federation of cloud providers including: a first data center operated by a first cloud provider, the first data center including a first set of one or more non-transitory computer readable media to store instructions, and a first set of one or more processors coupled with the first set of non-transitory computer readable storage media to process the stored instructions to perform the following first operations: receiving, from a tenant, a request to access a first service hosted in the first data center, where the tenant is associated with a unique pair of cryptographic tenant private key and tenant public key; and responsive to determining that the tenant is not associated with a delegation contract, recording a delegation contract including at least an identification of the first service hosted on the first data center, an identification of the tenant, and a first service offer that is cryptographically signed by the tenant and by the first service, where the first service offer indicates that the tenant is enrolled to use the first service. The federation of cloud providers also includes a second data center operated by a second cloud provider that is different from the first cloud provider, the second data center including: a second set of one or more non-transitory computer readable media to store instructions, and a second set of one or more processors coupled with the second set of non-transitory computer readable storage media to process the stored instructions to perform the following second operations: receiving, from a tenant, a request to access a second service hosted in the second data center, where the second data center is physically separate from the first data center, and responsive to determining that the tenant is associated with the delegation contract recorded in the blockchain database indicating that the tenant is enrolled to use one or more services hosted on servers of the federation of cloud providers, performing the following: causing an update of the delegation contract in the blockchain database to include an identification of the second service and a second service offer that is cryptographically signed by the tenant and by the second service, where the second service offer indicates that the tenant is enrolled to use the second service; causing the second service to provide access to the tenant based on the second service offer; transmitting, to the tenant, a confirmation that the second service can be accessed based on the second service offer; and transmitting an update to the first data center indicating that the delegation contract has been updated to include the second service offer.

BRIEF DESCRIPTION OF THE DRAWINGS

The invention may best be understood by referring to the following description and accompanying drawings that are used to illustrate embodiments of the invention. In the drawings:

FIG. 8 illustrates a flow diagram of exemplary operations performed in a federation of cloud providers for management of cloud services using smart contracts and blockchains in a federation of cloud providers, in accordance with some embodiments;

DETAILED DESCRIPTION

Figure 1:
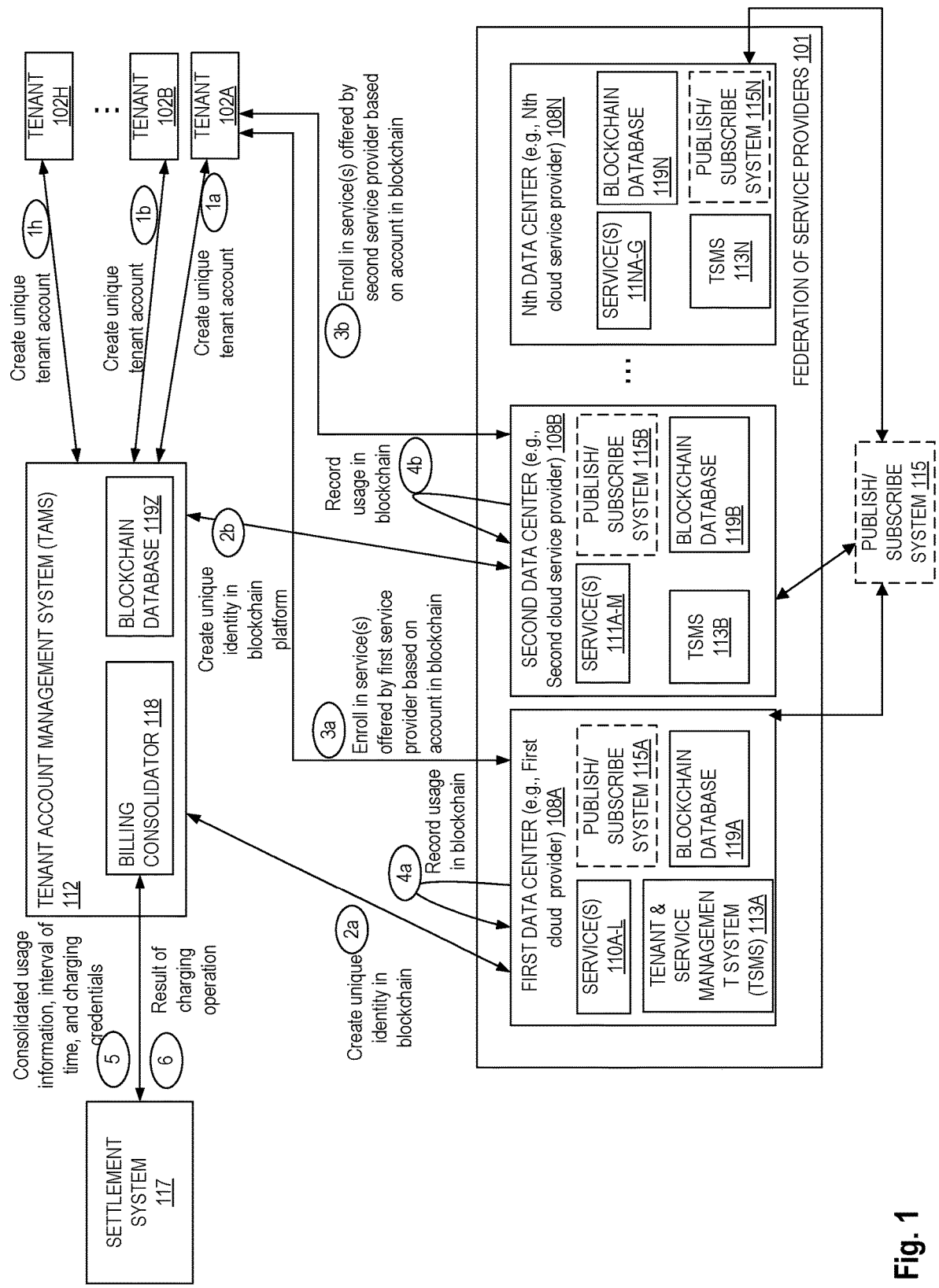
FIG. 1 illustrates a block diagram of an exemplary cloud-based infrastructure in which management of cloud-based services can be performed in a federation of cloud service providers, in accordance with some embodiments.

The following description describes methods and apparatus for management of cloud services using smart contracts to facilitate various functions, such as tenant login, tenant enrollment, service registration, tenant usage charging, tenant usage tracking, tenant quota management, and tenant rights revocation. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A blockchain system is a platform used for building, running, and deploying a distributed ledger. The distributed ledger permanently records, and in a verifiable way, digital records of transactions that occur between two parties. The distributed ledger is maintained without a central authority or implementation. The distributed ledger is referred to as a blockchain database that includes blocks, which are linked and secured using cryptography.

The embodiments of the present invention present a method in a federation of cloud providers of managing tenant and service access. The federation of cloud providers includes at least a first data center and a second data center, where the first data center is operated by a first cloud provider and the second data center is operated by a second cloud provider that is different from the first cloud provider. The first data center receives a request, from a tenant, to access a first service hosted in the first data center. The tenant is associated with a unique pair of cryptographic tenant private key and tenant public key. Responsive to determining that the tenant is not associated with a delegation contract, the first data center records in a blockchain database a delegation contract including at least an identification of the first service hosted on the first data center, an identification of the tenant, and a first service offer that is cryptographically signed by the tenant and by the first service. The first service offer indicates that the tenant is enrolled to use the first service. The second data center receives a request, from the tenant, to access a second service hosted in the second data center, where the second data center is physically separate from the first data center. Responsive to determining that the tenant is associated with the delegation contract recorded in the blockchain database indicating that the tenant is enrolled to use one or more services hosted on servers of the federation of cloud providers, the second data center causes an update of the delegation contract in the blockchain database to include an identification of the second service and a second service offer that is cryptographically signed by the tenant and by the second service, where the second service offer indicates that the tenant is enrolled to use the second service; causes the second service to provide access to the tenant based on the second service offer; transmits, to the tenant, a confirmation that the second service can be accessed based on the second service offer, and transmits an update to the first data center indicating that the delegation contract has been updated to include the second service offer.

FIG. 1 illustrates a block diagram of an exemplary cloud-based infrastructure in which management of cloud-based services can be performed in a federation of cloud providers, in accordance with some embodiments. A cloud federation 101 includes a set of cloud service providers that collaborate to provide a set of services to tenants 102A-H to achieve a business goal. Within the cloud federation, the individual cloud service providers can share resources, data and services. Tenants 102A-H may obtain multiple services via the cloud federation. For example, the cloud federation can collectively provide compute, network, and storage services. Each cloud provider from the federation provides a subset of services. Each cloud provider from the federation 101 can own one or more data centers. For example, the data center 108A is owned by a first cloud service provider (not shown), the second data center 108B is owned by another cloud service provider (the second cloud service provider) and the Nth data center is owned by a Nth cloud service provider (not shown). While in the illustrated figure each data center is owned by a different cloud service provider, in some embodiments, each cloud service provider may own one or more data center. The data center may be located at different geographical location and may include compute, storage, and networking resources for hosting one or more services. The exemplary cloud-based architecture of the federation 101 may include one or more data centers 108A-H disposed in a cloud operator network 106 that may be configured to offer a variety of resources and services to multiple tenants (i.e., multi-tenancy) pursuant to suitable service level agreements and service management contracts In the multitenant architecture, the federation 101 may be arranged to provide every tenant a dedicated or configurable share of a resource/service including its data, configuration, user management, tenant individual functionality as well as properties such as security, charging, etc.

A tenant, for the purposes of the present disclosure, may be understood as a person, organization, a service, business entity, or a group of users, that desires to enroll with the federation of service cloud providers for accessing a specific set of resources/services under particular authentication/authorization credentials, privileges, constraints, and/or policy-based business rules.

By way of illustration, a plurality of tenant entities 102A to 102H exemplified in FIG. 1 may comprise corporate, commercial or governmental organizations, a private person or a group of persons, that may request and consume one or more services 110A-L, 111A-M, 11NA-G respectively hosted by the cloud-based data centers 108A, 108B, and 108N via one or more electronic devices in tenant premises disposed in tethered (wired) or untethered (wireless) network environments. Each of the tenants 102A-N may have one or more users (not illustrated) that can, using an electronic device in a tenant premise, request and access one or more services of the federation 101. The users can be employees of an organization, a private individual, customers of an organization, etc. Each user can have a different level of access rights for accessing one or more of the services 110A-L, 111A-M, and 11NA-G. In some embodiments, tenants and services are represented in the federation 101 via contract accounts. The accounts are recorded by the tenant account management system (TAMS) 112 in a blockchain database 119Z through a blockchain platform. For example, at operations (1a, 1b, or 1h) each one of the tenants 102A, 102B, or 102H, perform an account creation process for creating a unique tenant account. Each account may specify the identity of the tenant (e.g., with unique identification of the tenant (e.g., the tenant's public key and contact information such as an email address, a phone number or the like)) and charging credentials for settlement upon usage of one or more services in the federation of service cloud providers 101. The tenant account allows each tenant to access the resources offered through the federation (i.e., through the combination of different cloud providers) with a single account and single identification and log-in credentials.

Example tenant entities 102A-102H may span across various types of businesses and industries, and may consume one or more resources/services 110A-L, 111A-M, and 11NA-G including, without limitation, cloud storage resources, processor compute resources, network bandwidth resources, load balancing services, virtualized network infrastructure resources, Software as a Service (SaaS) services, Platform as a Service (PaaS) services, Infrastructure as a Service (IaaS) services, streaming media services, voice telephony/VoIP services, and one or more inline services such as, e.g., Deep Packet Inspection (DPI) services, Virus Scanning (VS) services, Intrusion Detection and Prevention (IDP) services, Firewall (FW) filtering services and Network Address Translation (NAT) services, and the like.

Each service is represented in the federation of cloud providers 101 via a contract account. The service account is recorded by the TAMS 112 in the blockchain database 119Z through the blockchain platform. For example, at operations 2a or 2b each one of the tenants 102A, 102B, or 102H, perform an account creation process for creating a unique service account. Each service account specifies the identification of the service. The identification of the service includes a unique identifier that is generated for the service at the time of registration. In some embodiments, the service has a unique pair of cryptographic private and public keys defined based on an asymmetric cryptographic scheme. The service account may further specify a name for the service (e.g., a name in a human readable format), charging credentials for settlement upon usage of one or more services by the service, and contact information for one or more persons (e.g., the owner of the service, the administrator of the service, etc.). In some embodiments, the service can be identified with its cryptographic public key in some applications and with another identifier in other applications. For example, the cryptographic public key of the service can be used to identify the service within the blockchain database 119Z. In another example, a name of the service defined based on a top-level naming scheme that is different from the cryptographic public key of the service can be used to uniquely identify the service for usage tracking and billing. Each one of the services 110A-L, 111A-M, and 11NA-G includes a service manager SM that is operative to communicate with the TAMS 112 and respective tenant and service management systems 113A-N for performing administrative tasks related to the management of the service. For example, the SM is operative to register the service, and handle tenant enrollment and tenant login.

The TAMS 112 is operative to create unique tenant accounts for each tenant, data center accounts for the data centers and service accounts for the services hosted on the data center. These accounts are recorded in the blockchain database 119Z (which are replicated as per the blockchain mechanisms to the other blockchain databases 119A-N). The TAMS 112 also includes a billing consolidator 118 that is operative to obtain usage information for each tenant for the multiple services hosted in the federation 101, consolidate the usage and charge, at operation 5, the tenant for this consolidated usage based on the charging credentials set for the tenant. The billing consolidator 118 receives the result of the charging operation (from the settlement system 117) at operation 6 and is operative to act based on the results by either maintaining the services or suspending one or more of the services offered to the tenant.

Each one of the data centers 108A-N includes a respective TSMS 113A-N and a blockchain database 119A-N. In some embodiments, each of the TSMS 113A-N is operative to expose a communication interface (e.g., using a Representational state transfer (REST) Application Programming interface (API) formulated through Hypertext Transfer Protocol (HTTP) requests) for use by the tenants 102A-H and/or the services to enroll/register, request and obtain access to one or more of the services, and track usage of these services by the tenants and/or the services. The blockchain databases 119A-N are copies of the blockchain database 119Z and store smart delegation contracts established between the service(s) and the tenants 102A-H. While the blockchain databases 119A-N are illustrated as being part of the data center 108A-N, in some embodiments, the blockchain databases 119A-N can be located in one or more other electronic devices that are communicatively coupled with the data centers 108A-H and which are not part of the data centers 108A-H. The blockchain databases 119A-N and 119Z form part of a permissioned, distributed ledger that is implemented on multiple network devices.

In some embodiments, each data center 108A-N can include a respective publish/subscribe system 115A-N that enables the different components of the federation 101 to communicate via a publish/subscribe scheme. In some embodiments, instead of a local publish/subscribe system 115A-N, the various components of the federation of service providers can use a publish/subscribe system 115 that is not part of the data centers 108A-N. In some embodiments, some data centers may include a local publish/subscribe system while other data centers may use the external publish/subscribe system 115. The publish/subscribe systems 115A-N and 115, which are referred to herein below as the Pub/Sub systems, allow a publisher (e.g., a first data center 108A (e.g., a service 110A, the TSMS 113A, etc.), or another data center) to create a topic and to send messages to the topic. Other components of the federation 101 (e.g., other services 110B-M of the same data center, the TSMS 113B, the tenants 102A-H, the data center 108B-N, etc.) can subscribe to the topic to obtain updates/messages published to this topic by the publisher. In some embodiments, the messages are persisted in a message store until they are delivered and acknowledged by subscribers. The Pub/Sub systems 115A-H and 115 forwards messages from a topic to all of its subscriptions, individually. Each subscription receives messages either by Pub/Sub pushing them to the subscriber's chosen endpoint, or by the subscriber pulling them from the service. The subscriber receives pending messages from its subscription and acknowledges each one to the Pub/Sub system.

The federation 101 is operative to enable service access authorization to tenants and/or services based on smart contracts recorded on a permissioned, distributed ledger (e.g., a blockchain) through a blockchain platform. In some implementations, the TSMS 113A-N, and the TAMS 112 may be built on an open source distributed ledger and smart contract platform (e.g., Quorum™). The service TSMS 113A-N and the TAMS 112 function as DApps—that is, blockchain-based, distributed applications—on top of an open source distributed ledger. Each of the TSMS 113A-N and TAMS 112 accesses a copy of a blockchain database 119A-Z and interacts with smart delegation contract objects stored in the blockchain database. In some embodiments, each one of the TSMS 113A-N runs on a server in a respective data center 108A-N and is accessible to all the servers of the data center. In some embodiments, each server in a particular server cluster of the data center 108A-N (rack, rack row, etc.) may have an instance of the TSMS as well as an instance of the blockchain platform running on it, thus forming the blockchain and the tenant/service management platform. In some embodiments, data center instance management mechanisms may be used to confine the TSMS instances to specific servers, consequently reducing the overhead.

Smart delegation contracts are used to enable authorization and authentication of tenants when accessing one or more services hosted in the different data centers of the federation of service providers 101. For example, a smart delegation contract recorded for a tenant enables each TSMS 113A-N to provide and authorize tenants to access one or more of the services 110A-L, 111A-M, and 11NA-G as will be described in further details below. A smart delegation contract includes identification(s) of the service(s), an identification of the tenant, and the set of service offers to which the tenant has registered.

In the following description operations will be described between the first data center 108A, the second data center 108B, the tenant account management system 112, and the tenant 102A, by way of example and in the interest of simplifying the description below. One of ordinary skill in the art would recognize that these operations can be performed between other entities in the federation center without departing from the scope of the present invention. For example, multiple tenants can use the services offered through the federation of service providers 101. One or more services distributed over one or more data centers of the federation can be offered to each tenant.

Tenant Account Registration

Figure 2:
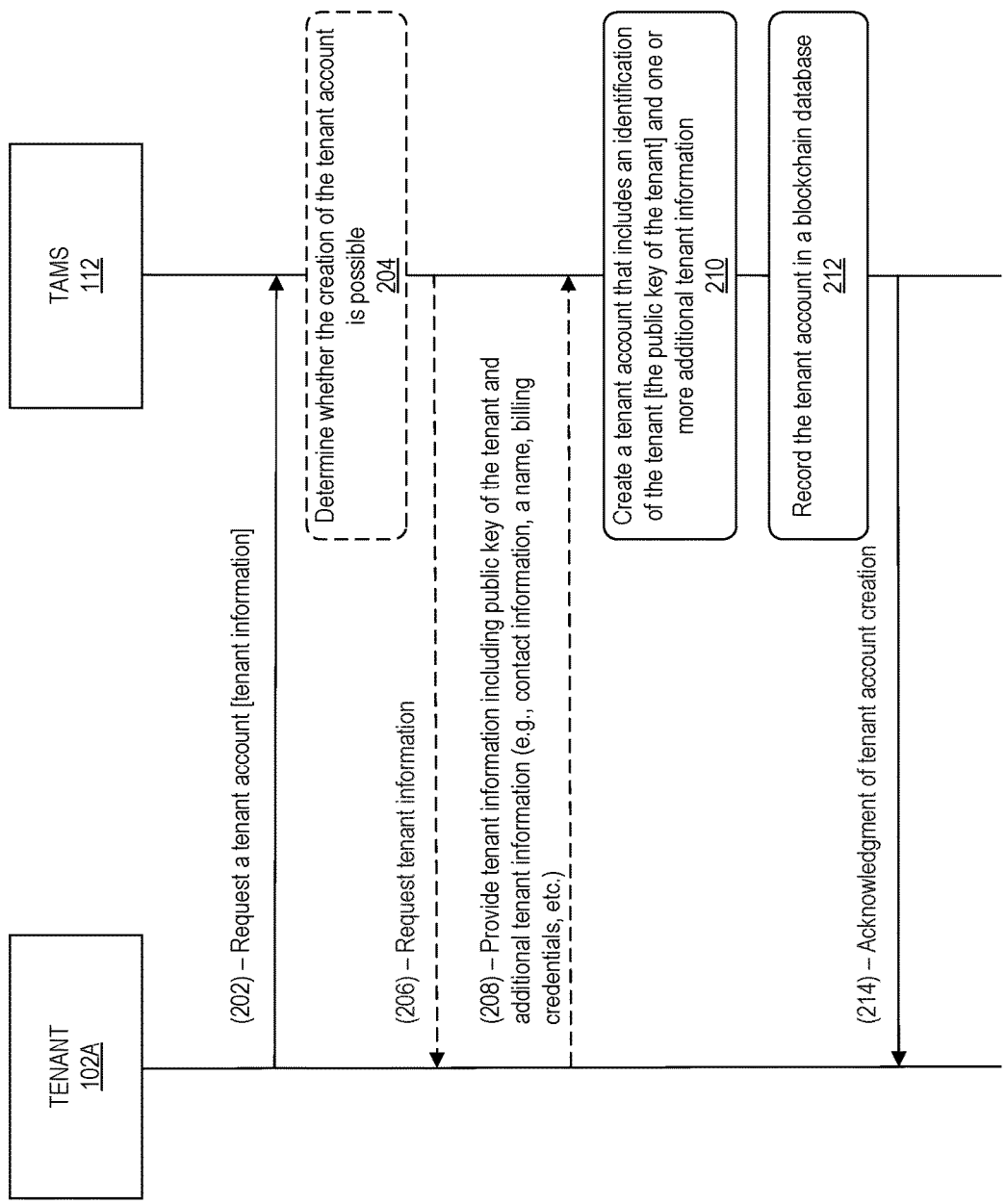
FIG. 2 illustrates a block diagram of exemplary operations for a tenant registration process, in accordance with some embodiments.

FIG. 2 illustrates a block diagram of exemplary operations for a tenant registration process, in accordance with some embodiments. At operation 202 the tenant 102A transmits a request for a tenant account. The tenant can access a graphical user interface (e.g., a web interface displayed on a browser or an application (such as a mobile application or desktop application) displayed on an electronic device. The graphical interface enables the tenant's electronic device to be coupled with the TAMS 112 and transmit the request (operation 202) to the TAMS 112. In some embodiments, the request at operation 202 includes tenant information such as a public key of the tenant (from a pair of public and private cryptographic key), contact information for the tenant (e.g., physical address, phone number, email address, etc.), a name of the tenant, billing credentials (e.g., credit card information, electronic payment information, bank account information, etc.), etc. In some embodiments, the tenant information is not included in the request and it can be requested at operation 206 by the TAMS 112 and obtained from the tenant 102A at operation 208. The request of the information can be performed following the determination at operation 204 of whether the account can be created for the tenant or prior to this determination. The TAMS 112 receives the request and may determine, in some embodiments, at operation 204 whether the creation of the tenant account is possible. In some embodiments, this determination may include determining whether an account already exists for the tenant 102A. Other operations can be performed to determine whether the creation of the account is possible, for example, determining whether the federation 101 has the capacity of handling new tenants, whether the tenant was not banned from using the services of the federations (based on past behavior), determining whether the tenant is a legitimate customer or whether the tenant is a bot or a malicious entity. In some embodiments, the determination of whether the creation of the tenant account is possible can be performed by accessing one or more records in the blockchain database to determine whether the tenant account is recorded in the blockchain database or whether the tenant is indicated as a malicious tenant, or a non-authorized tenant. In some embodiments, the operation 204 can be skipped and the tenant account can be created without any determination or verification.

Flow then moves to operations 210, at which the TAMS 112 creates an account that includes an identification of the tenant (e.g., the public key of the tenant) and one or more additional tenant information (e.g., billing credentials, contact information for the tenant, etc.). At operation 212, the TAMS 112 records the tenant account in a blockchain database. In some embodiments, the tenant account is recorded as a smart contract in the blockchain database 119Z. To enable the recordation of the tenant account in the blockchain database 119Z several operations and network nodes can be involved (e.g., generation of a transaction to be recorded, generation of the block including the transaction, as well as a consensus algorithm can be run between several nodes, etc.). The recorded account is replicated in all the copies of the blockchain databases 119A-N of the different data centers 108A-N. once the account is created, an acknowledgment that the tenant account has been created is transmitted from the TAMS 112 to the tenant 102A at operation 214.

Tenant Enrollment and Login

Figure 3A:
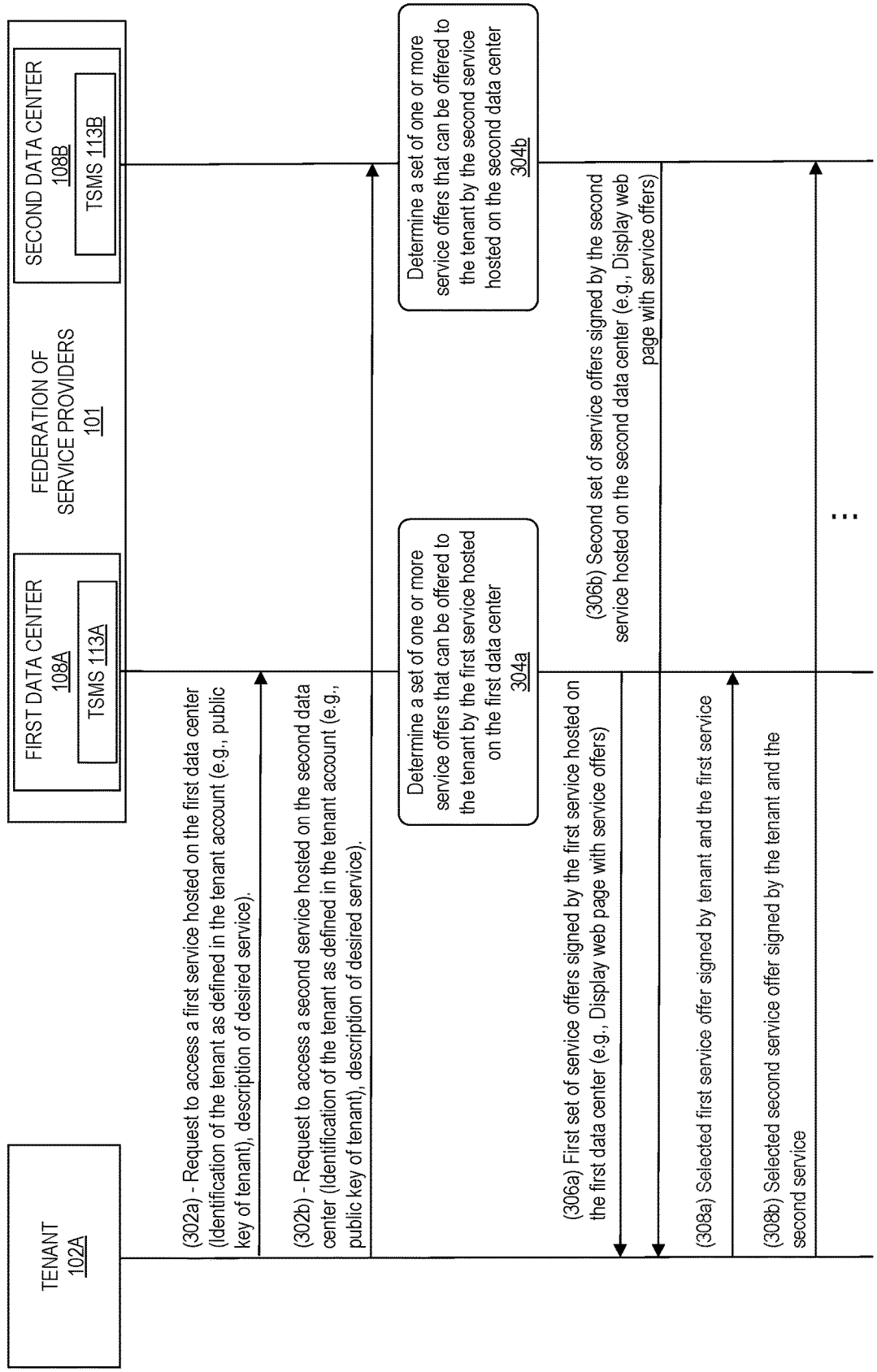
FIG. 3A illustrates a block diagram of exemplary operations for tenant enrollment in multiple services hosted on the federation of cloud service providers, in accordance with some embodiments.

FIG. 3A illustrates a block diagram of exemplary operations for tenant enrollment in multiple services hosted on the federation of cloud service providers, in accordance with some embodiments. After registering with the federation of cloud service providers 101, as described with reference to FIG. 2, the tenant 102A may log into the system and select the set of services that it needs, as illustrated in FIG. 3A-C.

Figure 3B:
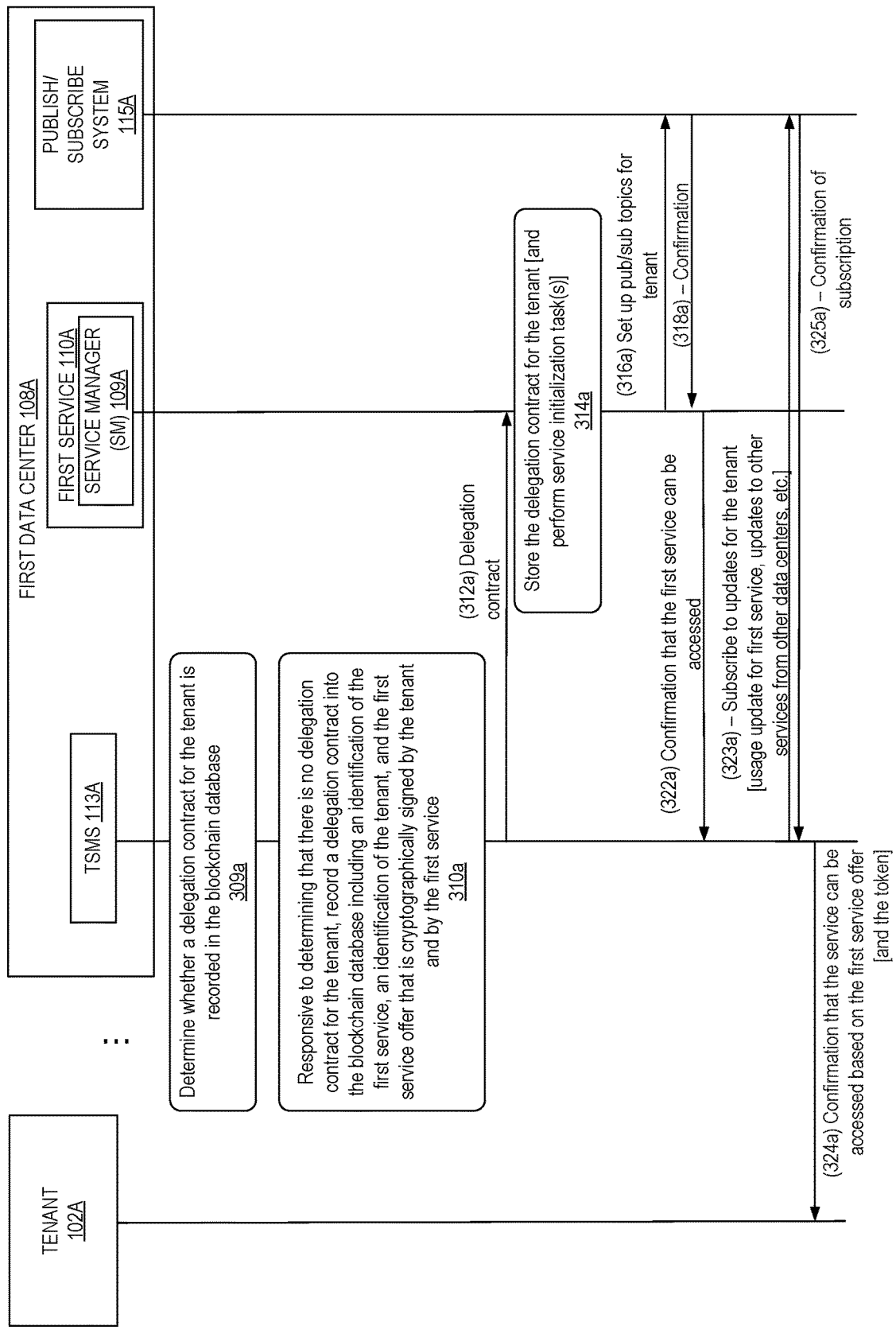
FIG. 3B illustrates a block diagram of operations performed to further enable service access authorization in a first data center of the federation of cloud service providers, in accordance with some embodiments.
Figure 3C:
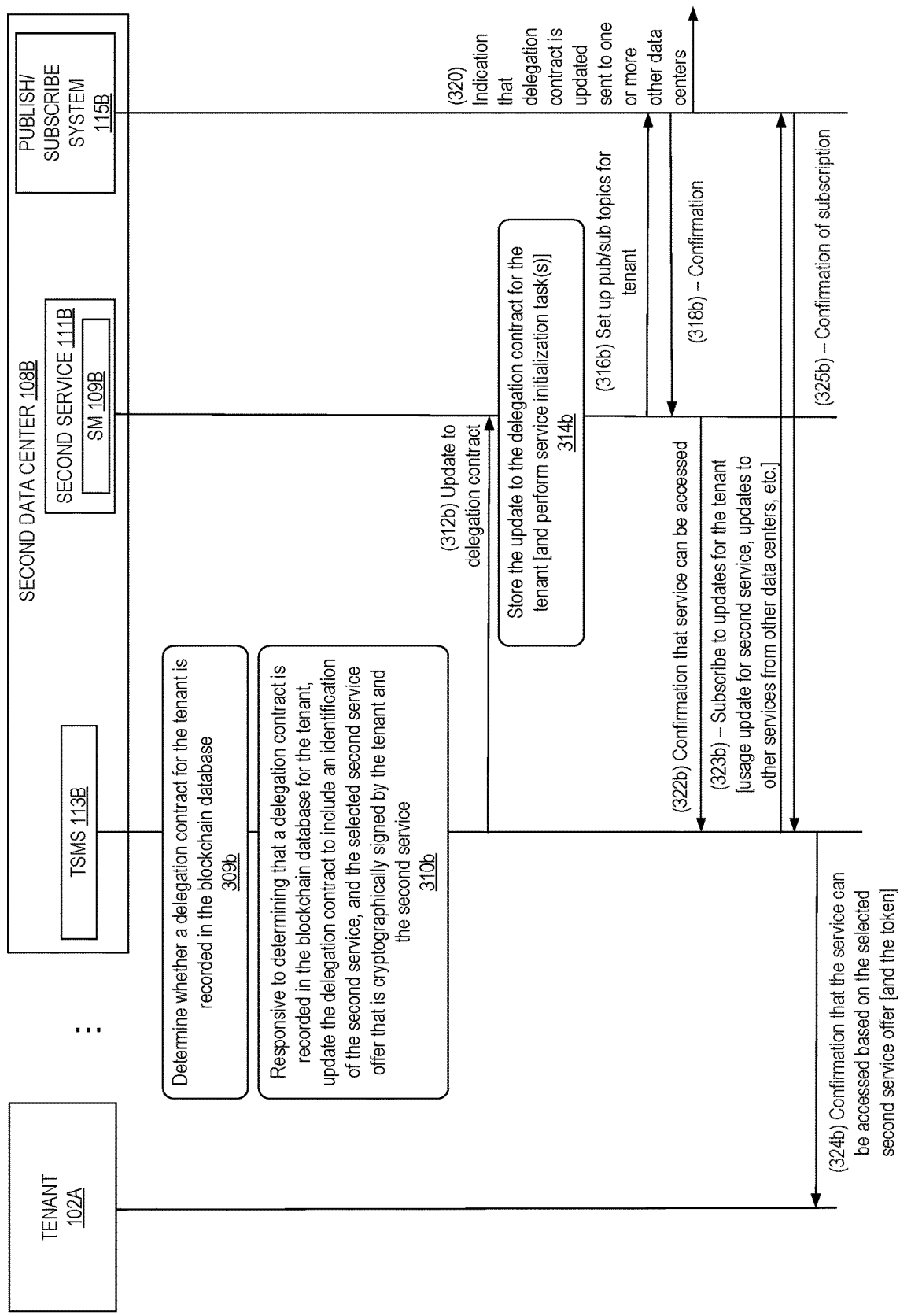
FIG. 3C illustrates a block diagram of operations performed to further enable service access authorization in a second data center of the federation of cloud service providers, in accordance with some embodiments.

FIGS. 3A-C illustrate block diagrams of exemplary operations for authorizing access to a service in accordance with some embodiments. In some embodiments, the operations of FIGS. 3A-C are performed when the tenant 102A attempts to enroll for usage of services hosted on the first data center 108A and the second data center 108B. For example, the tenant may attempt to subscribe to the first service 110A hosted on the first data center 108A and the second service 111A hosted on the second data center 108B. In the following description, the TSMS 113A performs the operations of the TSMS 113. In some embodiments, communications between the tenant 102A and the different components in the first data center 108A and the components in the second data center 108B can be a REST API messages formulated as HTTP messages.

At operation 302a, the TSMS 113A of the first data center 108A receives, from the tenant 102A, a request to access a first service 110A hosted in the first data center 108A. The tenant 102A is associated with a unique pair of cryptographic private and public keys. The tenant can be a user or a service from the first data center 108A or from other data centers. At operation 302b, the TSMS 113A of the second data center 108B receives, from the tenant 102A, a request to access a second service 111A hosted in the second data center 108B.

At operation 304a, the TSMS 113A of the first data center 108A determines a set of one or more service offers that can be offered by the first service 110A to the tenant 102A. In one embodiment, determining the set of service offers includes retrieving from a cache the set of one or more service offers. The set of service offers are received from the first service 110A. Each service offer is signed with a private key of the first service 110A. A service offer may include a description of service attributes defining the service that is to be offered. For example, a service offer may include quotas specifying the maximum amount of the service attributes that can be consumed by the tenant. In some embodiments, the service offer may also include charging schedules for the service attributes indicating how the tenant is to be charged for using the service as indicated in the service offer. Each service offer may be formatted in a language-independent file format such as a JSON document. Other formats can be used to define the service offer without departing from the scope of the present invention. In some embodiments, the service offers sent to the TSMS 113A can depend from the type of tenant to which they can be offered.

For example, a service offer can specify a grant of rights from the ComputeService for up to 5 virtual machines (VMs) with a maximum per VM memory of 4 GB and a maximum per VM CPU time of 3600 hours. The charging of VM CPU time in hours is done every 12 hours at the rate of 0.05 US Dollars per hour. The service offer described herein is intended to be exemplary only and should not be regarded as a limiting example of the embodiments of the present invention. Several types of offers can be defined and transmitted to the TSMS 113A without departing from the scope of the present invention.

At operation 304b, the TSMS 113B of the second data center 108B determines a set of one or more service offers that can be offered by the second service 111A to the tenant 102A. In one embodiment, determining the set of service offers includes retrieving from a cache the set of one or more service offers. The set of service offers are received from the second service 111A. Each service offer is signed with a private key of the second service 111A. A service offer may include a description of service attributes defining the service that is to be offered. For example, a service offer may include quotas specifying the maximum amount of the service attributes that can be consumed by the tenant. In some embodiments, the service offer may also include charging schedules for the service attributes indicating how the tenant is to be charged for using the service as indicated in the service offer. Each service offer may be formatted in a language-independent file format such as a JSON document. Other formats can be used to define the service offer without departing from the scope of the present invention. In some embodiments, the service offers sent to the TSMS 113B can depend from the type of tenant to which they can be offered.

For example, a service offer can specify a grant of rights from a storage as a service infrastructure identifying an amount of storage resources (e.g., 5 GB/months, 10 GB/months, etc.) that a tenant can use and an associated fee for that usage. The service offer described herein is intended to be exemplary only and should not be regarded as a limiting example of the embodiments of the present invention. Several types of offers can be defined and transmitted to the TSMS 113B without departing from the scope of the present invention.

Referring back to FIG. 3A, in some embodiments, each of the TSMS 113A and TSMS 113B may cache the offers of service received from the first service 110A and the second service 111A respectively, as signed with the private key of the first service 110A and the second service 111A. In other embodiments, the set of service offers are requested by the TSMS 113A and TSMS 113B upon receipt of the requests for services from the tenant 102A, are obtained from the respective services 110A and 111A, and used upon being received without the need for caching them.

At operation 306a, the TSMS 113A transmits the set of service offers signed by the first service 110A to the tenant 102A. In some embodiments, the TSMS 113A may cause the display of a graphical user interface (e.g., a web page on a web browser, a mobile application, etc.) including the service offers. At operation 306b, the TSMS 113B transmits the set of service offers signed by the second service 111A to the tenant 102A. In some embodiments, the TSMS 113B may cause the display of a graphical user interface (e.g., a web page on a web browser, a mobile application, etc.) including the service offers.

The tenant 102A selects, for each data center, one of these offers (e.g., a user may select through the web page displayed on an electronic device in the tenant premises, a desired service from a list of services that are offered). The TSMS 113A and 113B receive, at operation 308a and 308b respectively, from the tenant a respective a first service offer and a second service offer. The selected first service offer is cryptographically signed with the private key of the tenant and with the private key of the first service 110A. The signature is stored by the tenant and is used for accessing the first service 110A. In some embodiments, the signature resulting from the service offer being signed by the keys of the service and the tenant may be put into a JSON Web Token (JWT), which is a base 64 encoded copy of the JSON document containing the service offer. The JWT including the signature is stored by the tenant and is used for accessing the first service 110A. The selected second service offer is cryptographically signed with the private key of the tenant and with the private key of the second service 111A. The signature is stored by the tenant and is used for accessing the second service 111A. In some embodiments, the signature resulting from the service offer being signed by the keys of the second service and the tenant may be put into a JSON Web Token (JWT), which is a base 64 encoded copy of the JSON document containing the service offer. The JWT including the signature is stored by the tenant and is used for accessing the second service 111A.

While FIG. 3A shows that the tenant requests to access a single service from each data center, in some embodiments, the tenant may request to access more than one service per data center. While the operations of FIG. 3A are illustrated in a given order, these operations can be performed in different orders without departing from the scope of the present invention. For example, a tenant may request to access a first set of one or more services from the first data center 108A at a first time and may determine to request access to one or more services from the second data center 108B at a second time that is later than the first time. The time period can be from few seconds to few days, months, or years . . . .

FIG. 3B illustrates a block diagram of operations performed to further enable service access authorization in a first data center 108A of the federation of cloud service providers, in accordance with some embodiments. Once the TSMS 113A receives the selected first service offer from the tenant 102A, it determines at operation 309a whether a delegation contract, which may also be referred to herein as a smart delegation contract, is recorded in the blockchain database 119A for the tenant 102A. Responsive to determining that there is no delegation contract for the tenant in the blockchain database 119A, the TSMS 113A records, at operation 310a, a delegation contract into the blockchain database 119A. The smart delegation contract includes an identification of the service, an identification of the tenant, and the selected service offer that is cryptographically signed with the private key of the tenant and with the private key of the service. In some embodiments, the delegation contract further includes at least one of a set of one or more first identifiers uniquely identifying a set of one or more sub-delegates to which the first service offer can be delegated by the tenant, one or more quotas specifying a maximum amount of attributes of the first service that can be consumed by the tenant, a set of one or more second identifiers that uniquely identify a set of one or more entities that are allowed to revoke the delegation contract set for the tenant, an expiration time indicating a time and date after which access of the tenant to the first service is no longer valid, and a time of issue indicating the time and date at which the delegation contract was generated for the tenant.

At operation 312a, the TSMS 113A transmits the smart delegation contract between the tenant 102A and the first service 110A to the first service 110A. The first service 110A stores a copy of the delegation contract at operation 314a. In some embodiments, the first service 110A performs initialization tasks related to the service selected by the tenant 102A. In other embodiments, the initialization is performed at a later stage when the tenant 102A accesses the first service 110A. At operation 316a the first service 110A sets up Pub/Sub topics for the tenant 102A. These topics may allow a tenant 102A to obtain from the Pub/Sub system 115A messages related to the first service 110A when the service publishes any updates. In addition, the topics may allow the TSMS 113A to obtain from the Pub/Sub system 115A messages related to the tenant 102A and its usage activities of the first service 110A. The topics may further allow other data centers to obtain updates with respect to the tenant and its usage of the services in the first data center 108A. At operation 318a, upon the set-up of the topics, the Pub/Sub system 115A transmits a confirmation of subscription. At operation 322a, the first service 110A transmits a confirmation that the service can be accessed by the tenant. In some embodiments, the TSMS 113A can also perform operations 323a and 325a. At operation 323a, the TSMS 113A subscribes to usage updates for the tenant 102A and the first service 110A to receive any updates on the service offered by the first service 110A to the tenant 102A. The Pub/Sub system 115A transmits a confirmation of subscription at operation 325a. At operation 324a the TSMS 113A transmits to the tenant 102A a confirmation that the service can be accessed based on the selected service offer and the token (JWT). This is a confirmation that the tenant is enrolled with the first service 110A and can now request to access the first service 110A at any time.

FIG. 3C illustrates a block diagram of operations performed to further enable service access authorization in a second data center 108B of the federation of cloud service providers, in accordance with some embodiments. Once the TSMS 113B receives the selected second service offer from the tenant 102A, it determines at operation 309b whether a delegation contract, is recorded in the blockchain database 119B for the tenant 102A. Responsive to determining that there is a delegation contract for the tenant 102A in the blockchain database 119B, the TSMS 113B updates the delegation contract, at operation 310b, to include an identification of the second service 111A and the selected second service offer that is cryptographically signed by the tenant and the second service 111A. The smart delegation contract includes an identification of the first service 110A, an identification of the tenant, and the selected first service offer that is cryptographically signed with the private key of the tenant 102A and with the private key of the first service 110A, as well as an identification of the second service 111A, and the selected second service offer signed by the tenant 102A and the second service 111A (e.g., by their respective private cryptographic keys). In some embodiments, the delegation contract further includes at least one of a set of one or more first identifiers uniquely identifying a set of one or more sub-delegates to which the first service offer can be delegated by the tenant, a set of one or more second identifiers uniquely identifying a set of one or more sub-delegates to which the second service offer can be delegated by the tenant one or more quotas specifying a maximum amount of attributes of the first service 110A and the second service 111A that can be consumed by the tenant, a set of one or more third identifiers that uniquely identify a set of one or more entities that are allowed to revoke the delegation contract set for the tenant, an expiration time indicating a time and date after which access of the tenant to the first service 110A or the second service 111B is no longer valid, and a time of issue indicating the time and date at which the delegation contract was generated for the tenant.

At operation 312b, the TSMS 113B transmits the smart delegation contract between the tenant 102A and the second service 111A to the second service 111A. The second service 111A stores a copy of the delegation contract at operation 314b. In some embodiments, the second service 111A performs initialization tasks related to the service selected by the tenant 102A. In other embodiments, the initialization is performed at a later stage when the tenant 102A accesses the second service 111A. At operation 316b the second service 111A sets up Pub/Sub topics for the tenant 102A. These topics may allow a tenant 102A to obtain from the Pub/Sub system 115B messages related to the first service 111A when the first service 110A publishes any updates. In addition, the topics may allow the TSMS 113B to obtain from the Pub/Sub system 115B messages related to the tenant 102A and its usage activities of the second service 111A. The topics may further allow other data centers to obtain updates with respect to the tenant and its usage of the services in the second data center 108B. At operation 318b, upon the set-up of the topics, the Pub/Sub system 115B transmits a confirmation of subscription.

At operation 320, the pub/sub system 115B transmits an indication that the delegation contract for the tenant 102A has been updated. This indication is sent to one or more other data centers that can belong to the same cloud service provider as the service provider of the second data center 108B or that can belong to different cloud service providers. For example, the indication is received by the pub/sub system 115A of the first data center 108A and causes the first data center 108A to update a cached copy the smart delegation contract stored for the tenant 102A. this updated copy includes the identification of the services from the various data centers (e.g., the first service 110A and the second service 111A) and the respective service offers selected for each service.

At operation 322b, the first service 110A transmits a confirmation that the service can be accessed by the tenant. In some embodiments, the TSMS 113B can also perform operations 323b and 325b. At operation 323a, the TSMS 113B subscribes to usage updates for the tenant 102A and the second service 111A to receive any updates on the service offered by the second service 111A to the tenant 102A. The Pub/Sub system 115B transmits a confirmation of subscription at operation 325b. At operation 324b the TSMS 113B transmits to the tenant 102A a confirmation that the second service 111A can be accessed based on the selected service offer and the token (JWT). This is a confirmation that the tenant is enrolled with the second service 111A and can now request to access the second service 111A at any time.

Tenant Service Attribute Usage Tracking

Figure 4A:
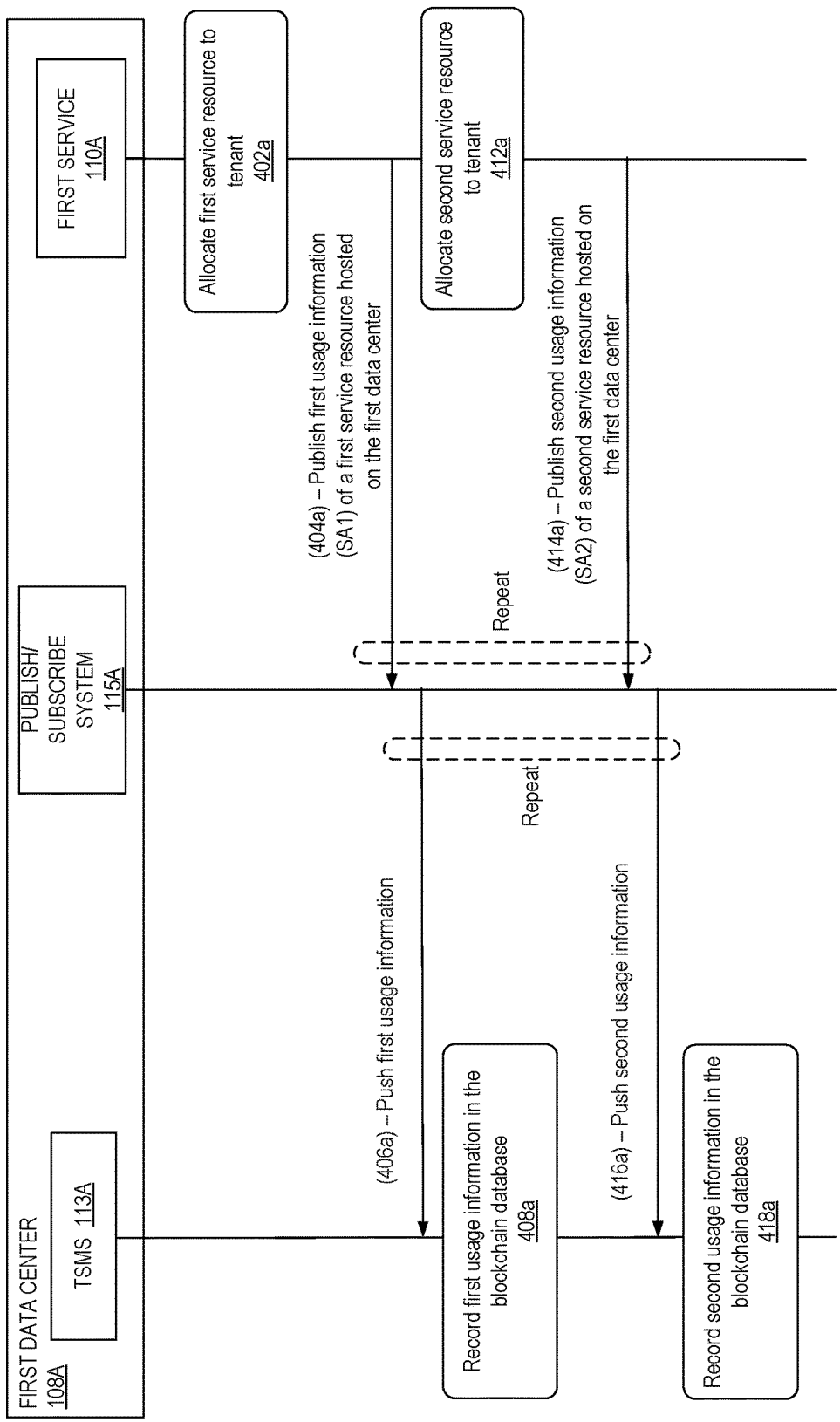
FIG. 4A illustrates a block diagram of exemplary operations for tracking of service usage in the first data center of a tenant, in accordance with some embodiments.

FIG. 4A illustrates a block diagram of exemplary operations for tracking of service usage in the first data center of a tenant, in accordance with some embodiments. Usage of consumable attributes (i.e., resources) by services and tenants is published so that TSMS 113A can record the usage information and allow for billing the tenant for the usage. FIG. 4A illustrates an example where a first service resource followed with a second service resource are allocated to the tenant 102A in the first data center 108A. At operation 402a, the first service 110A allocates the first service resource to the tenant 102A. Upon allocation of the first service resource, the first service 110A publishes, at operation 404a, the first usage information (SA1) of the first service resource to the Pub/Sub system 115A. The first usage information includes information about the type of resource allocated as well as the quota used by the tenant 102A. For example, the first usage information can be a number of virtual machines allocated for the tenant 102A. The first usage information is associated with an identifier of the first service 110A and an identifier of the tenant 102A (e.g., a public key of the first service 110A and a public key of the tenant 102A, respectively). The first usage information is pushed at operation 406a by the Pub/Sub system 115A to the TSMS 113A. The TSMS 113A records, at operation 408a, the first usage information into the blockchain database in association with the identifiers of the first service 110A and the tenant 102A.

At operation 412a, the first service 110A allocates a second service resource to the tenant 102A. Upon allocation of the second service resource, the first service 110A publishes, at operation 414a, the second usage information (SA2) of the second service resource to the Pub/Sub system 115A. The second usage information includes information about the type of resource allocated as well as the quota used by the tenant 102A. For example, the second usage information can be an amount of storage allocated for the tenant 102A. The second usage information is associated with an identifier of the first service 110A and an identifier of the tenant 102A (e.g., a public key of the first service 110A and a public key of the tenant 102A, respectively). The second usage information is pushed at operation 416a by the Pub/Sub system 115A to the TSMS 113A. The TSMS 113A records the second usage information into the blockchain database 119A in association with the identifiers of the first service 110A and the tenant 102A.

Figure 4B:
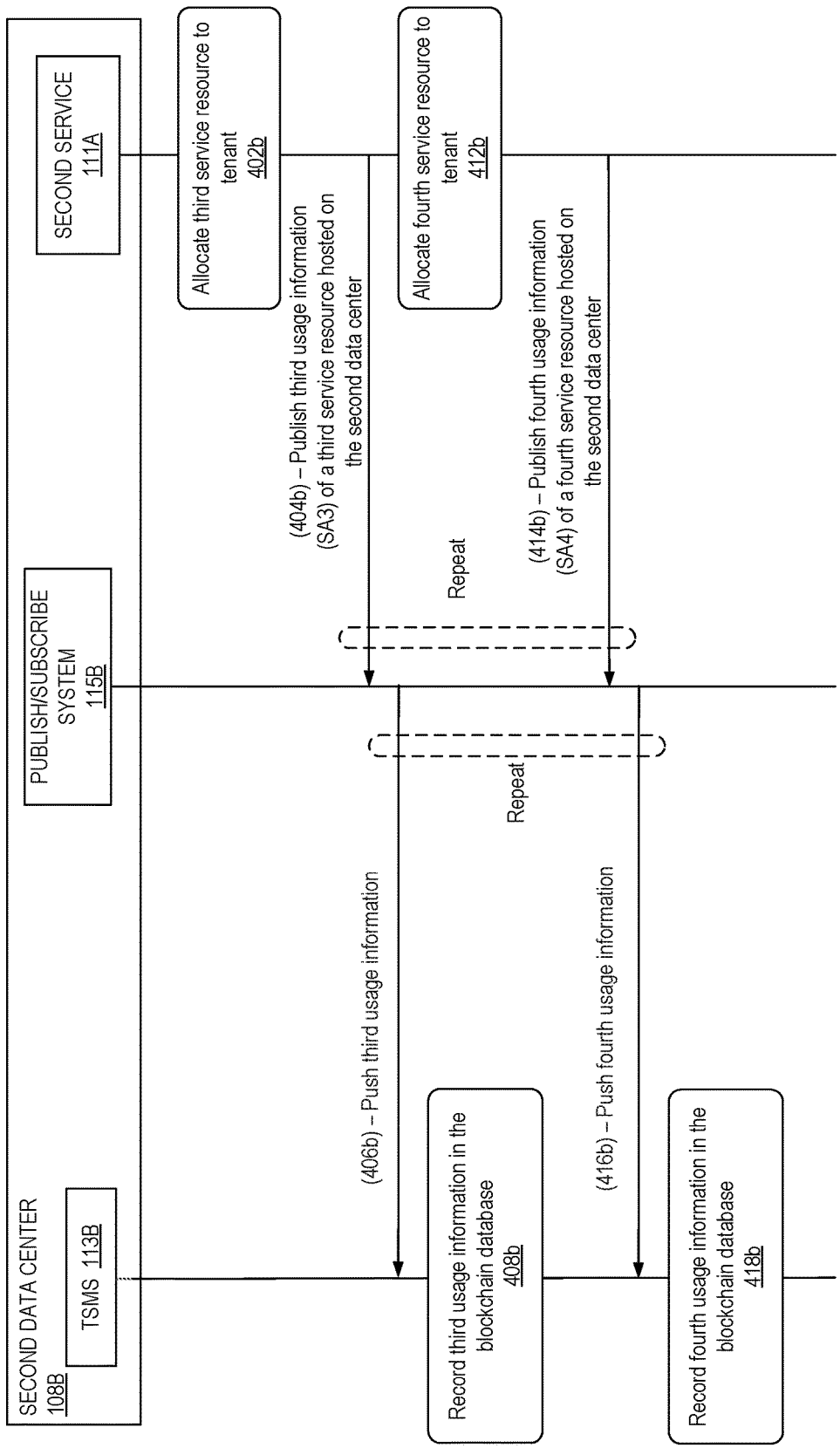
FIG. 4B illustrates a block diagram of exemplary operations for tracking of service usage in the second data center of a tenant, in accordance with some embodiments.

FIG. 4B illustrates a block diagram of exemplary operations for tracking of service usage in the second data center of a tenant, in accordance with some embodiments. Usage of consumable attributes (i.e., resources) by services and tenants is published so that TSMS 113B can record the usage information and allow for billing the tenant for the usage. FIG. 4B illustrates an example where a third service resource followed with a fourth service resource are allocated to the tenant 102A in the second data center 108B. At operation 402b, the second service 111A allocates the third service resource to the tenant 102A. Upon allocation of the third service resource, the second service 111A publishes, at operation 404b, the third usage information (SA3) of the third service resource to the Pub/Sub system 115B. The third usage information includes information about the type of resource allocated as well as the quota used by the tenant 102A. For example, the third usage information can be a number of virtual machines allocated for the tenant 102A in the second data center 108B. The third usage information is associated with an identifier of the second service 111A and an identifier of the tenant 102A (e.g., a public key of the second service 111A and a public key of the tenant 102A, respectively). The third usage information is pushed at operation 406b by the Pub/Sub system 115B to the TSMS 113B. The TSMS 113B records, at operation 408b, the third usage information into the blockchain database in association with the identifiers of the second service 111A and the tenant 102A.

At operation 412b, the second service 111A allocates a fourth service resource to the tenant 102A. Upon allocation of the fourth service resource, the second service 111A publishes, at operation 414b, the fourth usage information (SA4) of the fourth service resource to the Pub/Sub system 115B. The second usage information includes information about the type of resource allocated as well as the quota used by the tenant 102A. For example, the fourth usage information can be an amount of storage allocated for the tenant 102A. The second usage information is associated with an identifier of the second service 111A and an identifier of the tenant 102A (e.g., a public key of the second service 111A and a public key of the tenant 102A, respectively). The fourth usage information is pushed at operation 416b by the Pub/Sub system 115B to the TSMS 113B. The TSMS 113B records the second usage information into the blockchain database 119B in association with the identifiers of the second service 111A and the tenant 102A.

While the examples above are described with first and second service resources from the first service 110A being allocated to the tenant 102A and the third and fourth service resources from the second service 111A being allocated to the tenant 102A, in some embodiments different resources are allocated from different services within a single data center.

Thus, the TSMS 113A and TSMS 113B receive usage information from the first service 110A or the second service 111A and record this information into the blockchain database in association with the identifier of the user (e.g., tenant 102A) and the identifier of the service respectively. The TSMS 113A and 113B further record the type of service that was used and the amount of service resources used. In some embodiments, the amount of service resources can be a number of physical or virtual resources and/or a resource usage for a determined period of time. In some embodiments, the usage information is stored in a usage object in the blockchain database. The usage object includes the identifiers of the tenant 102A and the first service 110A or the second service 111A and the attributes of the allocated service resource(s). Thus, the TSMS 113A and the TSMS 113B enable tracking of service usage on the blockchain database 119A and 119B. As a service determines usage of its resources by a tenant or a service with an authorized smart delegation contract, the TSMS 113A or the TSMS 113B receives this information and populates the usage information in usage objects on the blockchain database.

Consolidated Usage Charging

The TAMS 112 includes a billing consolidator 118 that is operative to contact one or more outside settlement systems based on the credentials provided by the tenant 102A when they established their account with the federation of cloud service providers 101. In the event of an error, the billing consolidator 118 may contact the local TSMSs (e.g., TSMS 113A or 113B) to allow the service(s) to take an action in response to the occurrence of the error. For example, suspending execution of processes, prohibiting further processes from starting, or cutting off access to disk volumes. The billing consolidator 118 will then revoke the tenant's rights delegation until the tenant has an opportunity to pursue a mediation process with the federation 101, at which time the rights delegation can be restored. In some embodiments, the settlement system 117 is an entity that is external to the federation of cloud service providers. For example, a banking authority, a system accepting and handling cryptocurrency, and credit card providers can be examples of settlement systems 117 that can be used. A variety of charging credentials can be provided by tenants or services when they set up their accounts. The billing consolidator enables the different services offered on multiple data centers of the federation 101 to provide a single and consolidated bill for the tenant 102A that is to be transmitted to the settlement system 117.

Figure 5:
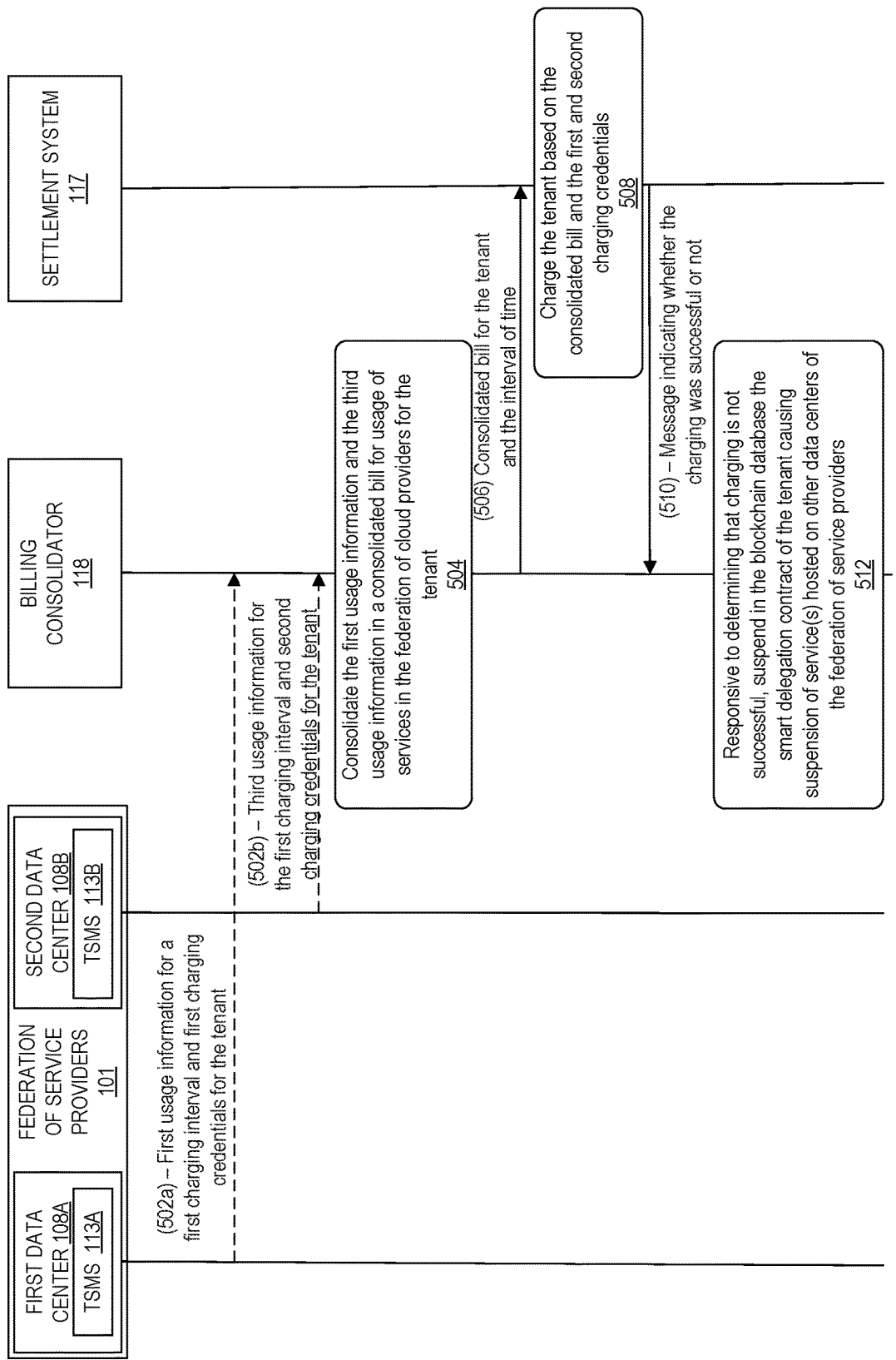
FIG. 5 illustrates a block diagram of exemplary operations for a usage charging process, in accordance with some embodiments.

FIG. 5 illustrates a block diagram of exemplary operations for a usage charging process, in accordance with some embodiments. At operation 502a, the first data center 108A (e.g., the TSMS 113A of the data center 108A) transmits first usage information for a first charging interval along with first charging credentials for the tenant 102A. This information is obtained by the TSMS 113A from the blockchain database 119A based on the usage tracked for the tenant 102A. For example, the usage information can be the amount of resources (number of VMs, memory size, etc.) that the tenant 102A consumed during an interval of time. The interval of time can be determined based on a billing schedule set up for the account of the user at the time the user registered for the service consumed. The billing schedule can be every month, every week, or at any other interval of time agreed upon by the tenant 102A and the consumed service (e.g., the first service 110A).

At operation 502b, the second data center 108B (e.g., the TSMS 113B of the data center 108B) transmits third usage information for first charging interval along with second charging credentials for the tenant 102A. This information is obtained by the TSMS 113B from the blockchain database 119B based on the usage tracked for the tenant 102A. For example, the usage information can be the amount of resources (number of VMs, memory size, etc.) that the tenant 102A consumed during an interval of time. The interval of time can be determined based on a billing schedule set up for the account of the user at the time the user registered for the service consumed. The billing schedule can be every month, every week, or at any other interval of time agreed upon by the tenant 102A and the consumed service (e.g., the second service 111A).

In some embodiments, instead of receiving the first usage information from the TSMS 113A and the third usage information from the TSMS 113B, the billing consolidator may obtain the information from the copy of the blockchain database 119Z without the need for contacting the TSMSs of the multiple data centers.

At operation 504, upon receipt of the first and the third usage information, the billing consolidator consolidates the usage information (first and third) in a consolidated bill for usage services in the federation of cloud providers for the tenant 102A. Thus, the tenant 102A is presented with a single bill for all services consumed over the multiple data centers even when the multiple data centers are owned by different cloud providers. The consolidated bill is transmitted to a settlement system 117 at operation 506. At operation 508, the settlement system 117 charges the tenant 102A based on the consolidated usage information and the first and the second charging credentials. In some embodiments, the first and the second charging credentials can be the same, while in other embodiments, the first and the second charging credentials can be different. While a consolidated bill is sent for the services consumed by the tenant in the different data centers, the billing can be performed based on different payment methods as agreed with the tenant at the time of enrollment of the tenant with the service. For example, a cryptocurrency account can be debited, a bank account of the tenant 102A can be debited, or a credit card charged with the amount indicated in each one of the usage information. At operation 510, the settlement system 117 transmits a message indicating whether the charging was successful or not. If the charging is successful, the message includes a confirmation of the payment made. If the charging is not successful, the message includes an error.

Upon receipt of the message indicating that the charging was not successful, the billing consolidator 118 suspends the smart delegation contract between for the tenant 102A in the blockchain database 119Z causing suspension of service(s) hosted on other data centers of the federation of service providers.

Figure 6:
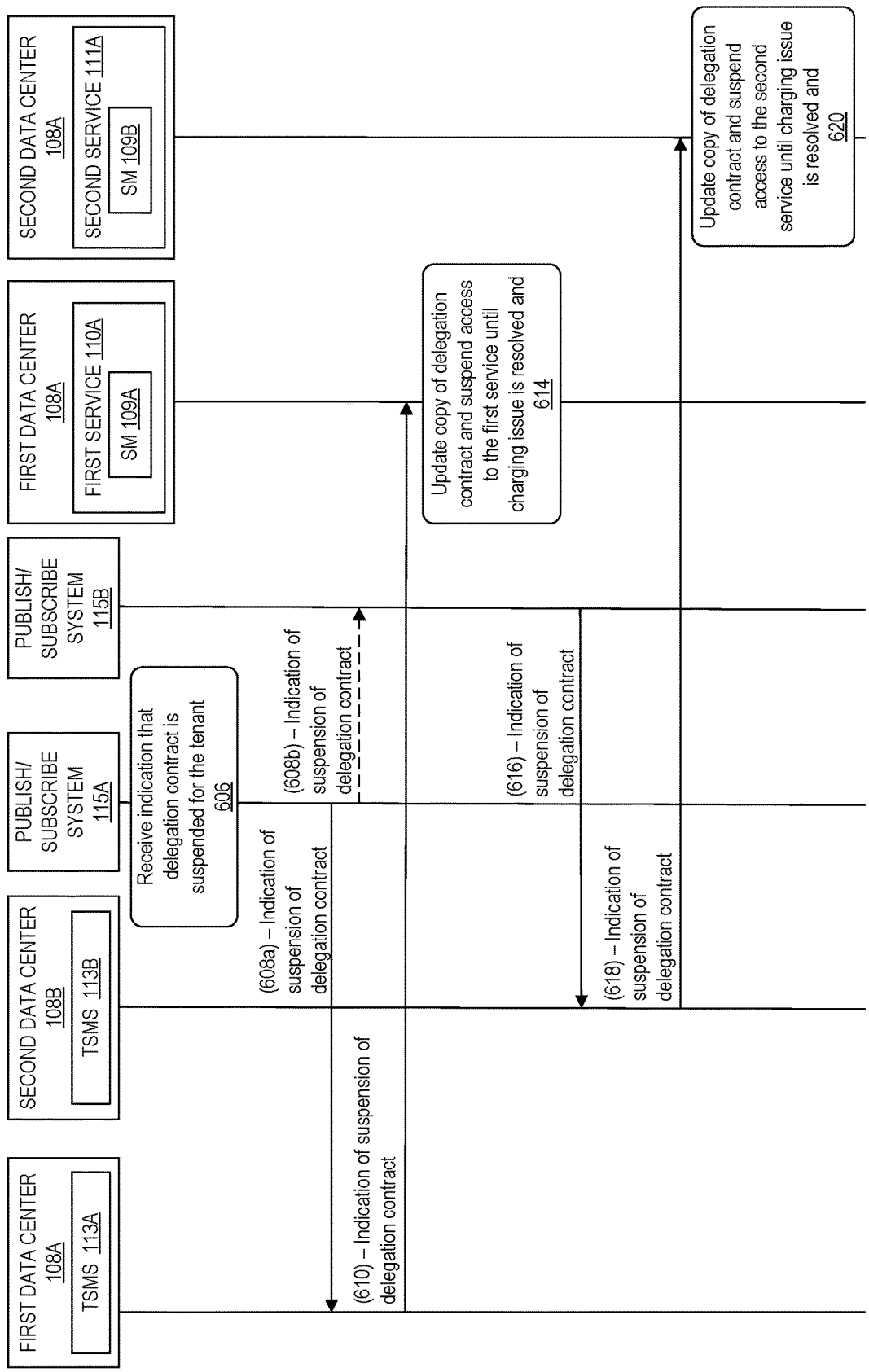
FIG. 6 illustrates a block diagram of exemplary operations for suspending one or more services for a tenant in a federation of cloud service providers, in accordance with some embodiments.

The billing consolidator 118 transmits an indication to one or more publish/subscribe systems 115A-N that the delegation contract is suspended for the tenant 102A. FIG. 6 illustrates a block diagram of exemplary operations for suspending one or more services for a tenant in a federation of cloud service providers, in accordance with some embodiments.

As a result of the update of the delegation contract in the blockchain databases and the subscription of the data centers to updates for that tenant, one or more pub/sub systems (e.g., 115A) receive the indication that the delegation contract is suspended for the tenant at operation 606. Upon receipt of the indication, the pub/sub system 115A transmits the indication to the TSMS 113A that is operative to manage the tenant's access in the first data center 108A. The TSMS 113A further transmits, at operation 610, an indication of suspension of the delegation contract (e.g., this indication can be an updated smart delegation contract that is marked as a suspended contract) to the first service 110A to inform the first service 110A that access should be suspended for the tenant 102A until the charging issue is resolved. At operation 614, the first service 110A suspends the service offered to the tenant 102A and updates the cached smart delegation contract to be suspended. In some embodiments, the smart delegation contract remains suspended until the charging issue is resolved and a new message is received from the TSMS 113A indicating that the service can resume.

In some embodiments, the pub/sub system 115A may further transmit the indication of suspension of service to the pub/sub 115B. In other embodiments the pub/sub system 115B receives the indication as a result of the update of the blockchain database at the billing consolidator without receiving a message from the pub/sub system 115A of the first data center 108A. The pub/sub system 115B transmits, at operation 616, the indication of suspension of delegation contract to the TSMS 113B of the second data center 108B. The TSMS 113B further transmits, at operation 618, an indication of suspension of the delegation contract (e.g., this indication can be an updated smart delegation contract that is marked as a suspended contract) to the second service 111A to inform the second service 111A that access should be suspended for the tenant 102A until the charging issue is resolved. At operation 620, the second service 111A suspends the service offered to the tenant 102A and updates the cached smart delegation contract to be suspended. In some embodiments, the smart delegation contract remains suspended until the charging issue is resolved and a new message is received from the TSMS 113B indicating that the service can resume.

When the tenant's rights delegation is suspended, the tenant is provided with an opportunity to pursue a mediation process with the federation of cloud service providers 101 (e.g., entering new charging credentials through the billing consolidator or alternatively through one or more of the TSMS 113A-N), at which time the rights delegation will be restored. For example, the tenant can be informed via email, text message, notification, or by a phone call that there was a problem with their settlement and is requested to pursue remediation with the federation of cloud services providers. In some embodiments, if the charging issue is not resolved for a predetermined period of time the smart delegation contract can be revoked and the user can be requested to register for the service(s) again in order to access the service(s).

Figure 7:
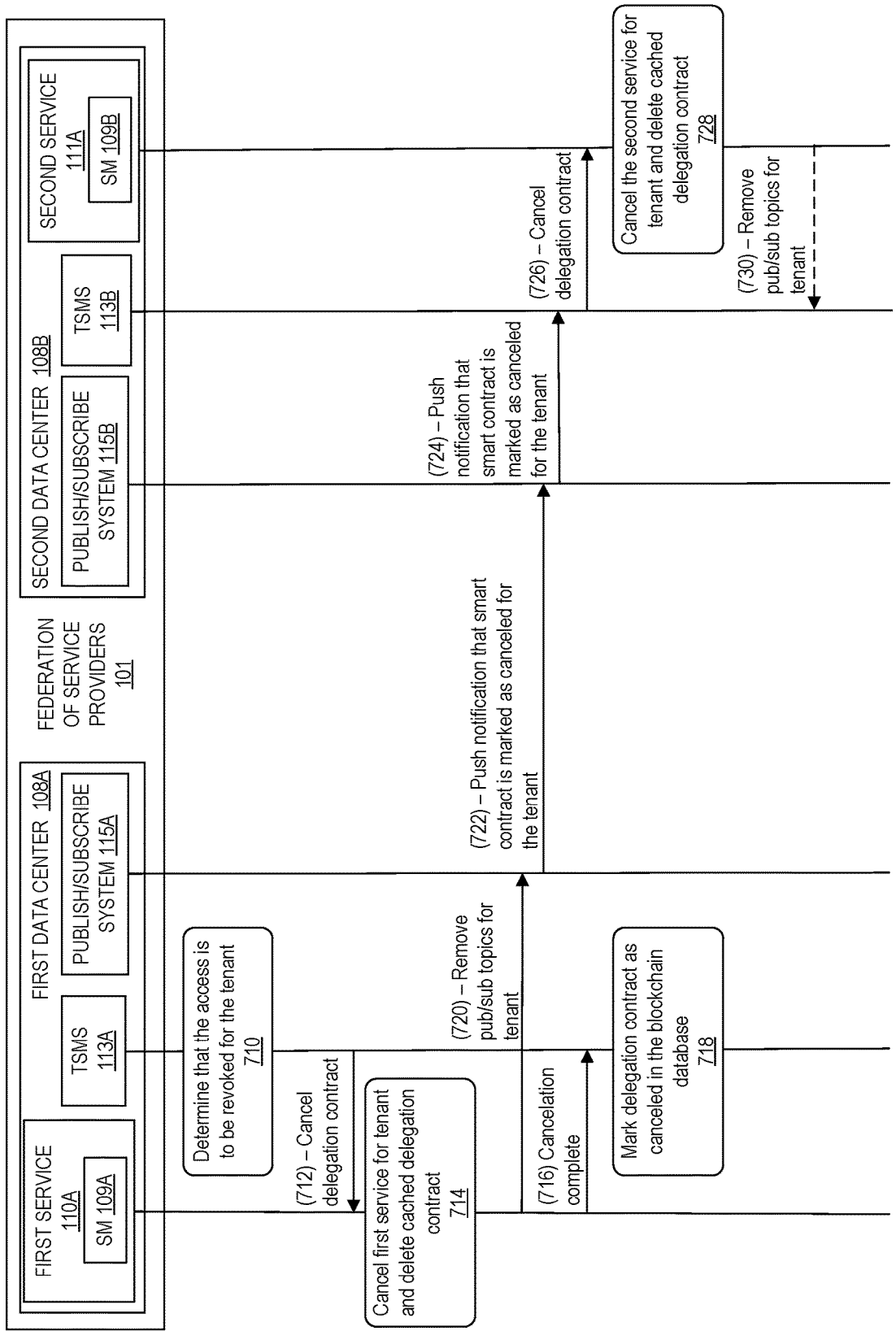
FIG. 7 illustrates a block diagram of exemplary operations for enabling revocation of service access to a tenant in a federation of cloud service providers, in accordance with some embodiments.

FIG. 7 illustrates a block diagram of exemplary operations for enabling revocation of service access to a tenant in a federation of cloud service providers, in accordance with some embodiments. The revocation of access rights for a tenant in the federation 101 is performed by marking the delegation contract as a deleted contract causing the tenant to re-enroll for the services that were previously established.

At operation 710, the first data center 108A determines that the access to the services on the first data center 108A is to be revoked for the tenant 102A. delegation is to be canceled for the tenant 102A. In some embodiments, the TSMS 113A can receive an indication from the billing consolidator 118 that the tenant failed to successfully update billing credentials following a suspension of the delegation contract for the tenant or a predetermined period of time allocated to the tenant 102A for updating the billing credential has timed out without the tenant successfully providing updated credentials. The TSMS 113A may determine that the tenant 102A is to be revoked access to the services hosted on the first data center as a result of a malicious behavior or for other reasons determined by the first data center 108A. Upon determining that the access is to be revoked for the tenant 102A, the TSMS 113A transmits, at operation 714, a request to cancel the delegation contract for the tenant 102A. The first service 110A receives the request and cancels the first service for the tenant and delete the cached delegation contract at operation 714. In some embodiments, if the first data center 108A hosts a plurality of services that are used by the tenant 102A, all these services are canceled for the tenant and the access to these resources is denied to the tenant 102A. The first service 110A transmits, at operation 720, a request to remove all pub/sub topics for the tenant 102A and confirm at operation 716 that cancellation of the service is performed. Once the TSMS 113A receives a confirmation that the cancelation of the services is complete, the TSMS 113A marks the delegation contract as canceled in the blockchain database, at operation 718. This update of the delegation contract causes the copies of the blockchain database to be updated to include the smart contract as canceled in all the other data centers.

At operation 722, the pub/sub system 115A pushes a notification to one or more data centers (e.g., data center 108B) to indicated that the smart contract is marked as canceled for the tenant 102A and service(s) access is to be revoked for this tenant. At operation 724, the pub/sub system 115B pushes the notification that the smart contract is marked as canceled to the TSMS 113B of the second data center 108B causing the second data center 108B to revoke access to the tenant in all services offered at the data center 108B. For example, the TSMS 113B transmits a request to cancel delegation contract to the second service 111A at operation 726. At operation 728, the second service 111A is cancelled for the tenant 102A and the cached delegation contract is deleted. In some embodiments, the second service 111A may transmit a request to remove all pub/sub topics for the tenant at operation 730. In other embodiments, the pub/sub topics may have already been removed upon receipt of the request at operation 720 in the first data center.

In the embodiments described herein, the cancelation of a service for a tenant in a single data center from the federation of service providers result in the cancellation and revocation of access to all the services offered through the federation regardless of who the owners of the services and data centers are. Further the pub/sub systems enable a seamless process for obtaining updates regarding the status of the delegation contract established for a tenant across the federation of cloud service providers.

The use of smart contracts to enable service registration, service access tracking and charging of service usage in a federation of cloud providers provides several advantages with respect to systems based on individual centralized databases for each cloud provider. The embodiments described herein enable the creation and recordation of a smart delegation contract between a tenant and a federation of cloud providers allowing for increased scalability and resilience. The enrollment of the tenant with several services hosted on multiple data centers that can be owned by different cloud service providers is recorded along with the terms of the services (i.e., the service offers) in a blockchain database. The embodiments enable the participation of multiple parties (e.g., the cloud infrastructures (i.e., the data centers), the service providers built on top of the cloud infrastructure (the services), tenants (e.g., organizations) and sub-tenants (e.g., employees, customers)) in complex business ecosystems. The embodiments herein enable fine-grained tracking of service usage, and a consolidated charging for the tenant's usage across the multiple cloud providers.

The embodiments herein provide a significant advantage over other techniques where multiple centralized databases store access information. The blockchain platform provides immutability of the delegation contract such that in case of a dispute, the blockchain database can be audited by a third party to determine the series of actions and events that occurred and that were agreed upon between the tenant and the different services hosted on the multiple cloud providers. Regulators, auditors, and mediators can be given permission for read-only access to the blockchain database in order to monitor and audit the activity. Industries which are heavily regulated, like financial services and health care services, can benefit from such an immutable system. In addition, the embodiments presented herein are particularly well suited to cases where multiple parties form a business ecosystem in which they cooperate in some cases and compete in others.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 8 illustrates a flow diagram of exemplary operations performed in a federation of cloud providers for management of cloud services using smart contracts and blockchains in a federation of cloud providers, in accordance with some embodiments. The federation of cloud providers 101 includes a plurality of data centers 108A-N. The plurality of data centers 108A-N includes at least a first data center that is operated by a first cloud provider and a second data center that is operated by a second cloud provider, where the second cloud provider is different from the first cloud provider. The operations of FIG. 8 are performed in the different components of the federation of cloud providers 101. At operation 802, the first data center 108A, receives a request, from a tenant (e.g., tenant 102A), to access a first service (e.g., 110A) hosted in the first data center 108A. The tenant 102A is associated with a unique pair of cryptographic tenant private key and tenant public key;

Responsive to determining that the tenant 102A is not associated with a delegation contract, the first data center 108A records, at operation 804, a delegation contract including at least an identification of the first service hosted on the first data center 108A, an identification of the tenant, and a first service offer that is cryptographically signed by the tenant and by the first service 110A. The first service offer indicates that the tenant is enrolled to use the first service. At operation 806, the second data center 108B receives a request, from the tenant, to access a second service (e.g., service 111A) hosted in the second data center 108B. The second data center 108B is physically separate from the first data center 108A and is owned by a different cloud provider. The operations move to operation 808, at which responsive to determining that the tenant 102A is associated with the delegation contract recorded in the blockchain database indicating that the tenant is enrolled to use one or more services hosted on servers of the federation of cloud providers, the second data center 108B performs a set of operations. The operations include operation 810, at which the second data center 108B causes an update of the delegation contract in the blockchain database to include an identification of the second service 111A and a second service offer that is cryptographically signed by the tenant and by the second service. The second service offer indicates that the tenant is enrolled to use the second service. The operations include operation 812, at which the second data center 108B causes the second service to provide access to the tenant based on the second service offer, and operation 814 at which the second data center 108B transmits, to the tenant, a confirmation that the second service 111A can be accessed based on the second service offer, and transmits an update to the first data center 108A indicating that the delegation contract has been updated to include the second service offer.

In some embodiments, each of the first data center 108A and the second data center 108B stores a copy of the delegation contract, as updated in the blockchain database for the tenant.

Figure 9:
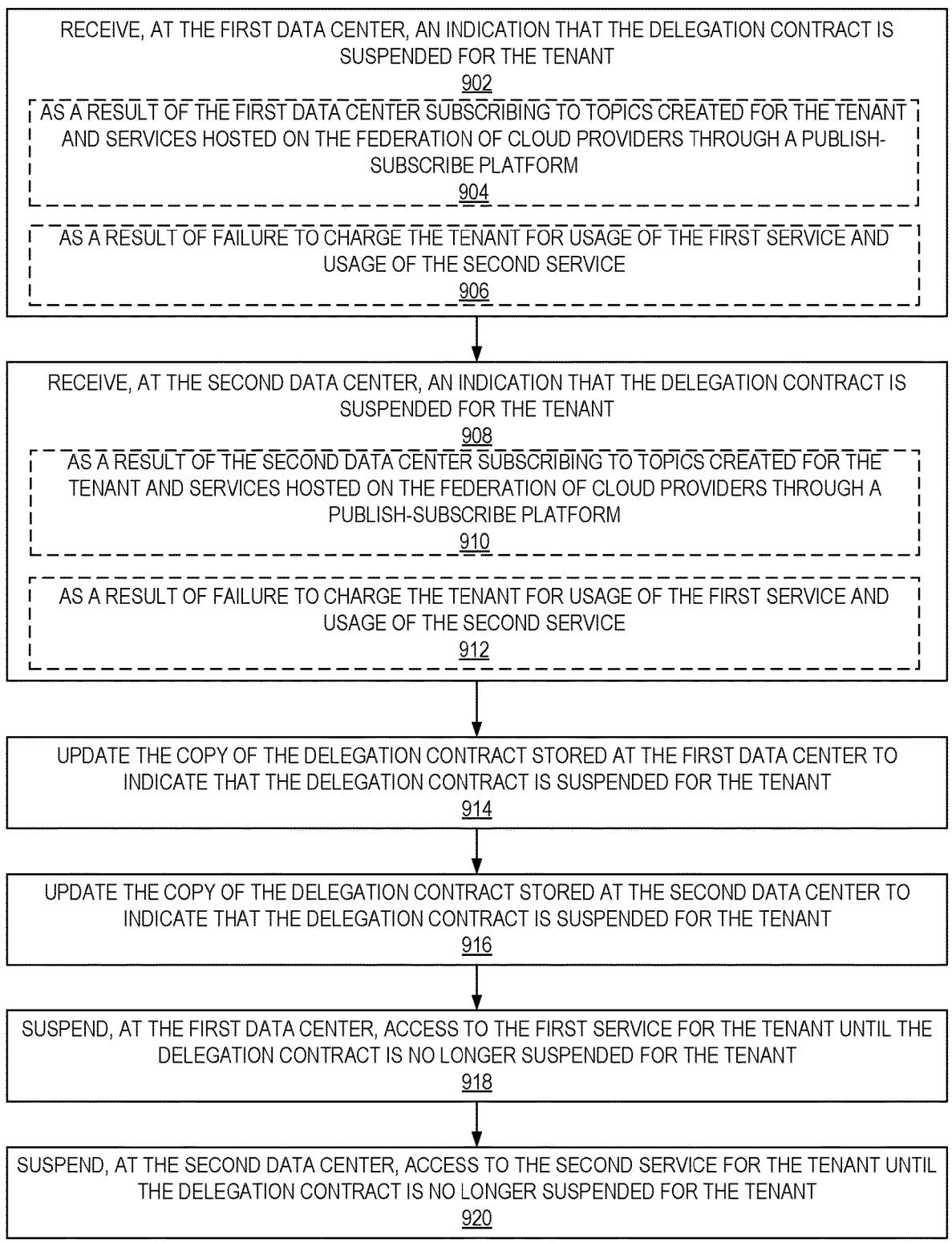
FIG. 9 illustrates a flow diagram of operations for suspending access to a tenant to resources of a service in a federation of cloud providers, in accordance with some embodiments.

FIG. 9 illustrates a flow diagram of operations for suspending access to a tenant to resources of a service in a federation of cloud providers, in accordance with some embodiments. At operation 902 and operation 908, each one of the first data center 108A and the second data center 108B receives an indication that the delegation contract is suspended for the tenant 102A. In some embodiments, the indication is received as a result (operation 904, operation 908) of the first data center 108A and the second data center 108B subscribing to topics created for the tenant and services hosted on the federation of cloud providers through a publish-subscribe platform. In some embodiments, the indication is received as a result (operation 906, operation 912) of failure to charge the tenant for usage of the first service 110A and usage of the second service 111A.

At operation 914, the copy of the delegation contract stored at the first data center 108A is updated to indicate that the delegation contract is suspended for the tenant. At operation 916, the copy of the delegation contract stored at the second data center 108B is updated to indicate that the delegation contract is suspended for the tenant 102A. At operation 918, the access to the first service 110A for the tenant 102A is suspended in the first data center 108A until the delegation contract is no longer suspended for the tenant 102A. At operation 920, access to the second service 111A for the tenant 102A is suspended in the second data center 108B until the delegation contract is no longer suspended for the tenant 102A.

Figure 10:
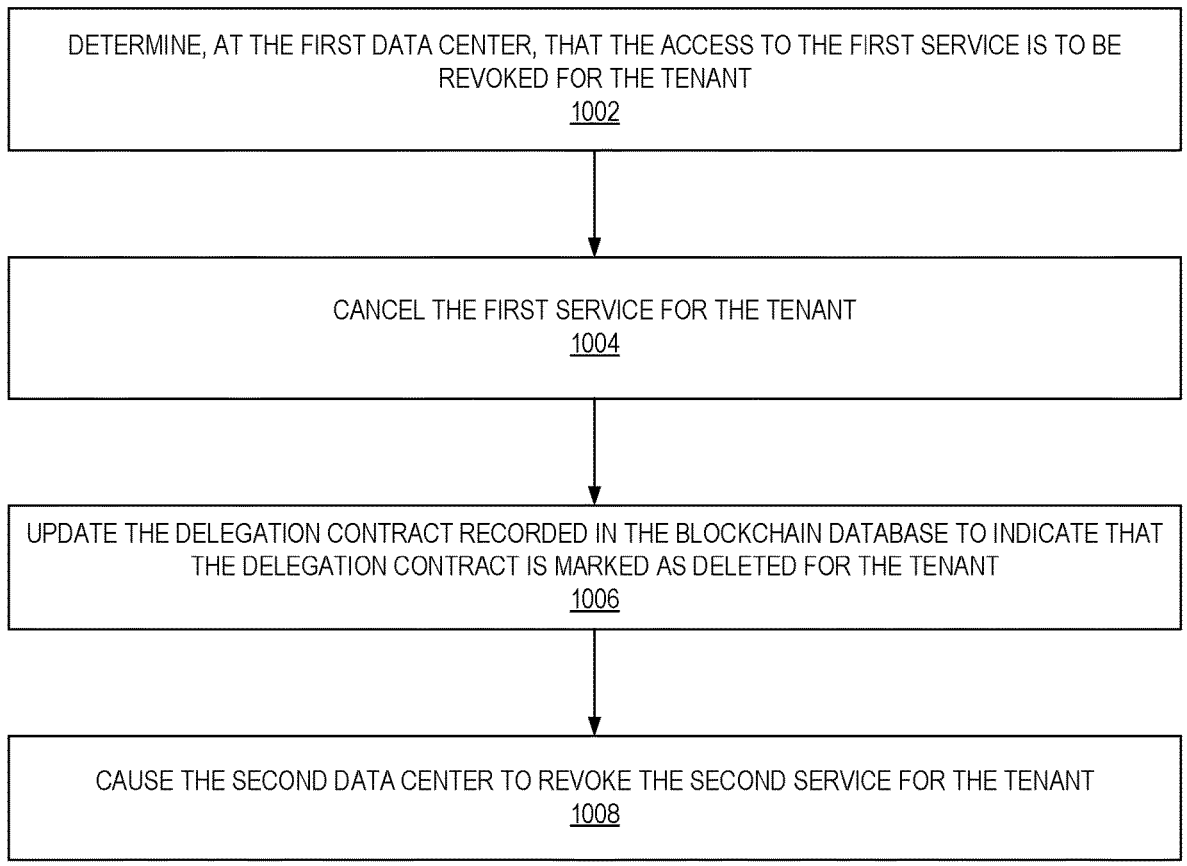
FIG. 10 illustrates a flow diagram of exemplary operations for cancelling access to a tenant to services in a federation of service cloud providers, in accordance with some embodiments.

FIG. 10 illustrates a flow diagram of exemplary operations for cancelling access to a tenant to services in a federation of service cloud providers, in accordance with some embodiments. At operation 1002, the first data center 108A determines that the access to the first service is to be revoked for the tenant 102A. In some embodiments, this may occur automatically by determining that the delegation contract has been suspended for a determined period of time without being re-activated. For example, the tenant may be given the period of time for proceeding to a reactivation mechanism of the services received through the federation of cloud providers. This may be performed by having the tenant reenter payment credentials for updating the billing process for the services. In other embodiments, the determination that the delegation contract is to be canceled can be performed by receiving at the first data center 108A of an explicit request to cancel all services offered to a particular tenant due to a malicious behavior of the tenant (e.g., failure to pay for the services, behavior that is against policy set by the federation of cloud providers, etc.), or other reasons.

Responsive to determining that the access is to be revoked for the tenant, operations 1004-1008 are performed. At operation 1004, the first service is canceled for the tenant. At operation 1006, the delegation contract recorded in the blockchain database is updated to indicate that the delegation contract is marked as deleted for the tenant. At operation 1008, the second data center 108B is caused to cancel the second service for the tenant as a result of the cancellation of the service for the tenant in the first data center 108A. In some embodiments, the second data center 108B is caused to cancel the service for the tenant as illustrated in FIG. 7 operations 720-728.

The use of smart contracts to enable service registration, service access tracking and charging of service usage in a federation of cloud providers provides several advantages with respect to systems based on individual centralized databases for each cloud provider. The embodiments described herein enable the creation and recordation of a smart delegation contract between a tenant and a federation of cloud providers allowing for increased scalability and resilience. The embodiments enable the participation of multiple parties (e.g., the cloud infrastructure, the service providers built on top of the cloud infrastructure, tenants (e.g., organizations) and sub-tenants (e.g., employees, customers)) in complex business ecosystems. The embodiments herein enable fine-grained tracking of service usage by the tenant, including a charging the tenant according to this usage that is centralized across the multiple cloud providers.

The embodiments herein provide a significant advantage over other techniques where multiple centralized databases store access information, by relying on the immutable aspect of the blockchain database storing the contracts. Immutability of the smart delegation contracts means that in case of a dispute, the blockchain database can be audited by a third party to determine the series of actions and events that occurred and that were agreed upon between the tenant and the different services hosted on the multiple cloud providers. Regulators, auditors, and mediators can be given permission for read-only access to the blockchain database in order to monitor and audit the activity. Industries which are heavily regulated, like financial services and health care services, can benefit from such an immutable system. In addition, the embodiments presented herein are particularly well suited to cases where multiple parties form a business ecosystem in which they cooperate in some cases and compete in others.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of the system 100 can be implemented on one or more network devices coupled in a network. For example, each of the services, the TSMSs 113A-N, the publish/subscribe systems 115, 115A-N, the settlement system 117, and the TAMS 112 can be implemented on one ND or distributed over multiple NDs. While each one of the blockchain database 119A-Z is illustrated as a single entity, one or ordinary skill in the art would understand that the blockchain database is a permissioned, distributed ledger that is implemented on multiple network devices such that a copy of the blockchain database is replicated in each data center acting as a blockchain node. Similarly, the tenants 102A-N may be abstract organization for which access to the service is enabled through the use of one or more network devices to access the resources and services of the federation 101.

Figure 11:
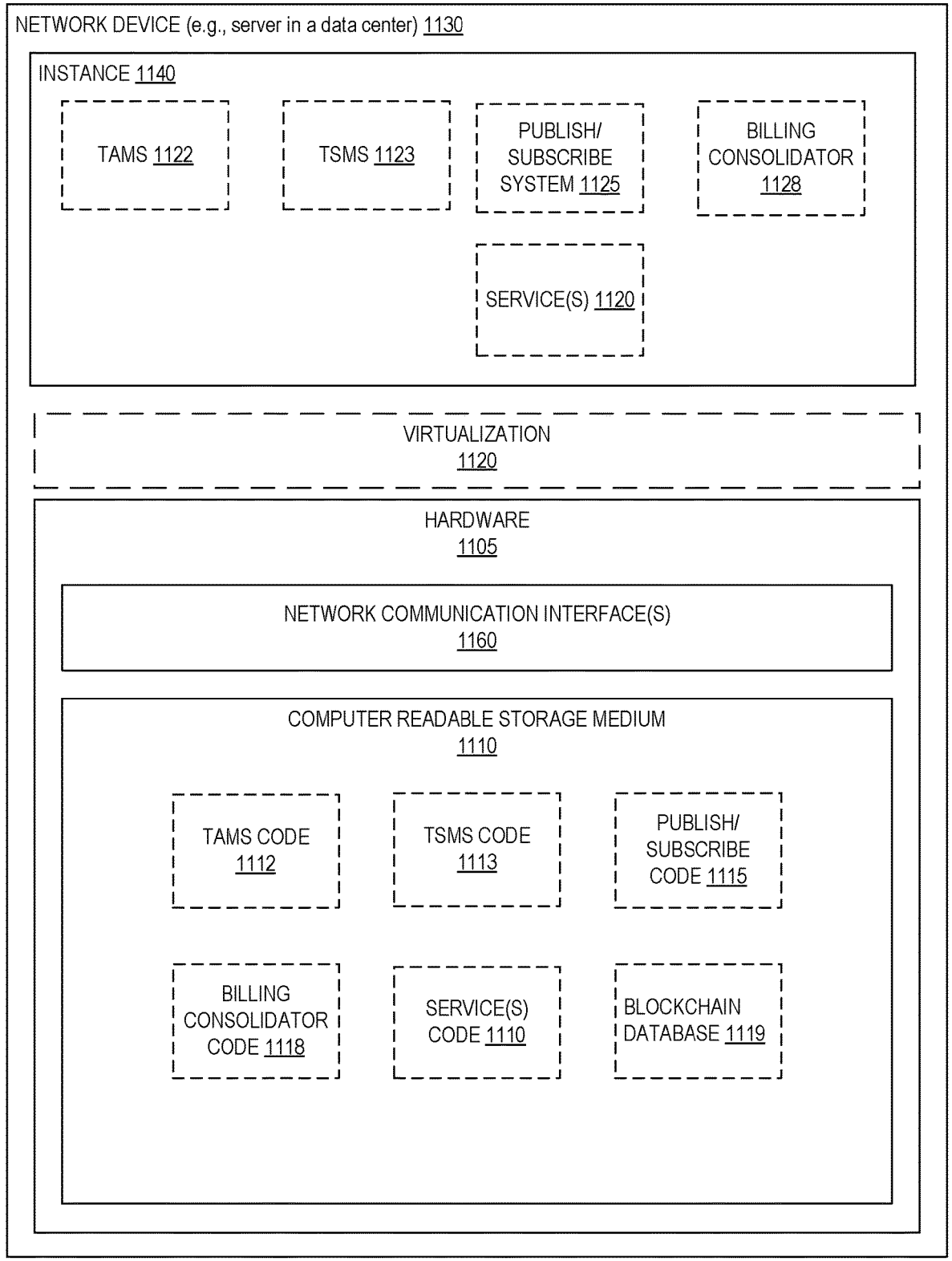
FIG. 11 illustrates a block diagram for a network device that can be used for implementing one or more of the components described herein, in accordance with some embodiments.

FIG. 11 illustrates a block diagram for a network device that can be used for implementing one or more of the components described herein, in accordance with some embodiments. The network device 1130 may be a web or cloud server, or a cluster of servers, running on server hardware. According to one embodiment, the network device is a server device which includes server hardware 1105. Server hardware 1105 includes one or more processors 1116, network communication interfaces 1160 coupled with a computer readable storage medium 1114. The computer readable storage medium 1114 may include one or more of TAMS code 1112, TSMS code 1113, publish subscribe code 1115, billing consolidator code 1118, service(s) code 1110, and the blockchain database 1119.

While one embodiment does not implement virtualization, alternative embodiments may use different forms of virtualization—represented by a virtualization layer 1120. In these embodiments, the instance 1140 and the hardware that executes it form a virtual server which is a software instance of the modules stored on the computer readable storage medium 1114.

Each of the TAMS code 1112, TSMS Code 1113, the publish/subscribe code 1115, the billing consolidator code 1118, and the service(s) code 1110 include instructions which when executed by the hardware 1105 causes the instance 1140 to respectively implement a TAMS 1122, a TSMS 1123, a publish/subscribe system 1125, a billing consolidator 1128, or one or more service(s) 1120. While the network device is illustrated as including an instance of each of a TAMS 1122, a TSMS 1123, a publish/subscribe system 1125, a billing consolidator 1128, and one or more service(s) 1120, in some embodiments, a server in a data center may include a subset of these components. For example, a server may include an instance of a TSMS 1123 (e.g., TSMS 113A, TSMS 113B, or 113N), another server may include an instance of a pub/sub system 1125 (e.g., pub/sub system 115A. 115B, or 115N), a third server may include an instance of a service 1120, a server may include an instance of the TAMS 1122 (e.g., TAMS 112), and a server may include an instance of the billing consolidator 1128 (e.g., billing consolidator 118). In other embodiments, two or more of these instances can be executed on the same server. For example, a first server can include an instance of the TAMS 1122, an instance of the billing consolidator 1128, an instance of the publish/subscribe system 1125, and a copy of the blockchain database 1119Z. This server may be located in one of the data centers that are part of the federation or in a server that is dedicated for these instances that is not part of any of the data centers. One or more data centers of the federation may include a server with an instance of TSMS 1123, an instance of a publish/subscribe system 1125, an instance of one or more service(s) 1120, and a copy of the blockchain database (e.g., 119A-N). Alternatively, each instance of a component can be distributed over multiple servers without departing from the scope pf the present invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a federation of cloud providers including at least a first data center and a second data center, wherein the first data center is operated by a first cloud provider and the second data center is operated by a second cloud provider that is different from the first cloud provider, the method comprising:
receiving, at the first data center, a request, from a tenant, to access a first service hosted in the first data center, wherein the tenant is associated with a unique pair of cryptographic tenant private key and tenant public key;
responsive to determining that the tenant is not associated with a smart delegation contract recorded in a blockchain database, recording, by the first data center, a smart delegation contract in the blockchain database, wherein the smart delegation contract includes at least an identification of the first service hosted on the first data center, an identification of the tenant, and a first service offer that is cryptographically signed by the tenant and by the first service, and wherein the first service offer indicates that the tenant is enrolled to use the first service;
receiving, at the second data center, a request, from the tenant, to access a second service hosted in the second data center, wherein the second data center is physically separate from the first data center;
responsive to determining that the tenant is associated with the smart delegation contract recorded in the blockchain database indicating that the tenant is enrolled to use one or more services hosted on servers of the federation of cloud providers, performing, by the second data center, the following:
causing an update of the smart delegation contract in the blockchain database to include an identification of the second service and a second service offer that is cryptographically signed by the tenant and by the second service, wherein the second service offer indicates that the tenant is enrolled to use the second service,
causing the second service to provide access to the tenant based on the second service offer,
transmitting, to the tenant, a confirmation that the second service can be accessed based on the second service offer, and
transmitting an update to the first data center indicating that the smart delegation contract has been updated to include the second service offer;
receiving, at the first data center and at the second data center, an indication that the smart delegation contract is suspended for the tenant, wherein the receiving the indication that the smart delegation contract is suspended is performed as a result of failure to charge the tenant for usage of the first service and usage of the second service;
updating the copy of the smart delegation contract stored at the first data center to indicate that the smart delegation contract is suspended for the tenant;
updating the copy of the smart delegation contract stored at the second data center to indicate that the smart delegation contract is suspended for the tenant;
suspending, at the first data center, access to the first service for the tenant until the smart delegation contract is no longer suspended for the tenant; and
suspending, at the second data center, access to the second service for the tenant until the smart delegation contract is no longer suspended for the tenant.

2. The method of claim 1 further comprising:
storing, at the first data center and at the second data center, a copy of the smart delegation contract, as updated in the blockchain database for the tenant.

3. The method of claim 1, wherein the receiving the indication that the smart delegation contract is suspended is further performed as a result of the first data center and the second data center subscribing to topics created for the tenant and services hosted on the federation of cloud providers through a publish-subscribe platform.

4. The method of claim 1, further comprising:
determining, at the first data center, that the access to the first service is to be revoked for the tenant; and
responsive to determining that the access to the first service is to be revoked for the tenant, performing the following:
cancelling the first service for the tenant,
updating the smart delegation contract recorded in the blockchain database to indicate that the smart delegation contract is marked as deleted for the tenant, and
causing the second data center to revoke the second service for the tenant.

5. The method of claim 1, wherein the identification of the first service is a public key from a first unique pair of cryptographic first private and first public keys associated with the first service, the identification of the second service is a second public key from a second unique pair of cryptographic second private and second public keys associated with the second service, and the identification of the tenant is the tenant public key.

6. The method of claim 1, wherein the smart delegation contract further includes at least one of: a set of one or more first identifiers uniquely identifying a set of one or more sub-delegates to which the first service offer can be delegated by the tenant, a set of one or more second identifiers uniquely identifying a set of one or more sub-delegates to which the second service offer can be delegated by the tenant, one or more quotas specifying a maximum amount of attributes of the first service and the second service that can be consumed by the tenant, a set of one or more third identifiers that uniquely identify a set of one or more entities that are allowed to revoke the smart delegation contract set for the tenant, an expiration time indicating a time and date after which access of the tenant to the first service or the second service is no longer valid, and a time of issue indicating the time and date at which the smart delegation contract was generated for the tenant.

7. A federation of cloud providers comprising:
a first data center operated by a first cloud provider, the first data center including:

a first set of one or more non-transitory computer readable media to store instructions, and
a first set of one or more processors coupled with the first set of one or more non-transitory computer readable media to process the stored instructions to perform the following first operations:
receiving, from a tenant, a request to access a first service hosted in the first data center, wherein the tenant is associated with a unique pair of cryptographic tenant private key and tenant public key, and
responsive to determining that the tenant is not associated with a smart delegation contract in a blockchain database, recording a smart delegation contract in the blockchain database, wherein the smart delegation contract includes at least an identification of the first service hosted on the first data center, an identification of the tenant, and a first service offer that is cryptographically signed by the tenant and by the first service, wherein the first service offer indicates that the tenant is enrolled to use the first service; and
a second data center operated by a second cloud provider that is different from the first cloud provider, the second data center including:
a second set of one or more non-transitory computer readable media to store instructions, and
a second set of one or more processors coupled with the second set of one or more non-transitory computer readable media to process the stored instructions to perform the following second operations:
receiving, from a tenant, a request to access a second service hosted in the second data center, wherein the second data center is physically separate from the first data center, and
responsive to determining that the tenant is associated with the smart delegation contract recorded in a blockchain database indicating that the tenant is enrolled to use one or more services hosted on servers of the federation of cloud providers, performing the following:
causing an update of the smart delegation contract in the blockchain database to include an identification of the second service and a second service offer that is cryptographically signed by the tenant and by the second service, wherein the second service offer indicates that the tenant is enrolled to use the second service,
causing the second service to provide access to the tenant based on the second service offer,
transmitting, to the tenant, a confirmation that the second service can be accessed based on the second service offer, and
transmitting an update to the first data center indicating that the smart delegation contract has been updated to include the second service offer,
wherein the first operations further include:
receiving an indication that the smart delegation contract is suspended for the tenant, wherein the receiving the indication that the smart delegation contract is suspended is performed as a result of failure to charge the tenant for usage of the first service and usage of the second service;
updating the copy of the smart delegation contract stored at the first data center to indicate that the smart delegation contract is suspended for the tenant, and
suspending access to the first service for the tenant until the smart delegation contract is no longer suspended for the tenant, and
wherein the second operations further include:
receiving an indication that the smart delegation contract is suspended for the tenant,
updating the copy of the smart delegation contract stored at the second data center to indicate that the smart delegation contract is suspended for the tenant, and
suspending access to the second service for the tenant until the smart delegation contract is no longer suspended for the tenant.

8. The federation of cloud providers of claim 7, wherein the first operations further include:
storing, at the first data center, a copy of the smart delegation contract as updated in the blockchain database for the tenant; and
wherein the second operations further include:
storing, at the second data center, the copy of the smart delegation contract as updated in the blockchain database for the tenant.

9. The federation of cloud providers of claim 7, wherein the receiving the indication that the smart delegation contract is suspended is further performed as a result of the first data center and the second data center subscribing to topics created for the tenant and services hosted on the federation of cloud providers through a publish-subscribe platform.

10. The federation of cloud providers of claim 7, wherein the first operations further include:
determining, at the first data center, that the access to the first service is to be revoked for the tenant; and
responsive to determining that the access to the first service is to be revoked for the tenant, performing the following:
cancelling the first service for the tenant,
updating the smart delegation contract recorded in the blockchain database to indicate that the smart delegation contract is marked as deleted for the tenant, and
causing the second data center to revoke the second service for the tenant.

11. The federation of cloud providers of claim 7, wherein the identification of the first service is a public key from a first unique pair of cryptographic first private and first public keys associated with the first service, the identification of the second service is a second public key from a second unique pair of cryptographic second private and second public keys associated with the second service, and the identification of the tenant is the tenant public key.

12. The federation of cloud providers of claim 7, wherein the smart delegation contract further includes at least one of: a set of one or more first identifiers uniquely identifying a set of one or more sub-delegates to which the first service offer can be delegated by the tenant, a set of one or more second identifiers uniquely identifying a set of one or more sub-delegates to which the second service offer can be delegated by the tenant, one or more quotas specifying a maximum amount of attributes of the first service and the second service that can be consumed by the tenant, a set of one or more third identifiers that uniquely identify a set of one or more entities that are allowed to revoke the smart delegation contract set for the tenant, an expiration time indicating a time and date after which access of the tenant to the first service or the second service is no longer valid, and a time of issue indicating the time and date at which the smart delegation contract was generated for the tenant.

13. A non-transitory computer readable storage media, which store instructions that when executed by one or more processors of a federation of cloud providers including at least a first data center and a second data center, wherein the first data center is operated by a first cloud provider and the second data center is operated by a second cloud provider that is different from the first cloud provider, cause the processors to perform operations comprising:
   receiving, at the first data center, a request, from a tenant, to access a first service hosted in the first data center, wherein the tenant is associated with a unique pair of cryptographic tenant private key and tenant public key;
   responsive to determining that the tenant is not associated with a smart delegation contract recorded in a blockchain database, recording, by the first data center, a smart delegation contract in the blockchain database, wherein the smart delegation contract includes at least an identification of the first service hosted on the first data center, an identification of the tenant, and a first service offer that is cryptographically signed by the tenant and by the first service, and wherein the first service offer indicates that the tenant is enrolled to use the first service;
   receiving, at the second data center, a request, from the tenant, to access a second service hosted in the second data center, wherein the second data center is physically separate from the first data center;
   responsive to determining that the tenant is associated with the smart delegation contract recorded in the blockchain database indicating that the tenant is enrolled to use one or more services hosted on servers of the federation of cloud providers, performing, by the second data center, the following:
      causing an update of the smart delegation contract in the blockchain database to include an identification of the second service and a second service offer that is cryptographically signed by the tenant and by the second service, wherein the second service offer indicates that the tenant is enrolled to use the second service,
      causing the second service to provide access to the tenant based on the second service offer,
      transmitting, to the tenant, a confirmation that the second service can be accessed based on the second service offer, and
      transmitting an update to the first data center indicating that the smart delegation contract has been updated to include the second service offer;
   receiving, at the first data center and at the second data center, an indication that the smart delegation contract is suspended for the tenant, wherein the receiving the indication that the smart delegation contract is suspended is performed as a result of failure to charge the tenant for usage of the first service and usage of the second service;
   updating the copy of the smart delegation contract stored at the first data center to indicate that the smart delegation contract is suspended for the tenant;
   updating the copy of the smart delegation contract stored at the second data center to indicate that the smart delegation contract is suspended for the tenant;
   suspending, at the first data center, access to the first service for the tenant until the smart delegation contract is no longer suspended for the tenant; and
   suspending, at the second data center, access to the second service for the tenant until the smart delegation contract is no longer suspended for the tenant.

14. The non-transitory computer readable storage media of claim 13, wherein the operations further comprise:
   storing, at the first data center and at the second data center, a copy of the smart delegation contract, as updated in the blockchain database for the tenant.

15. The non-transitory computer readable storage media of claim 13, wherein the receiving the indication that the smart delegation contract is suspended is further performed as a result of the first data center and the second data center subscribing to topics created for the tenant and services hosted on the federation of cloud providers through a publish-subscribe platform.

16. The non-transitory computer readable storage media of claim 13, further comprising:
   determining, at the first data center, that the access to the first service is to be revoked for the tenant; and
   responsive to determining that the access to the first service is to be revoked for the tenant, performing the following:
      cancelling the first service for the tenant,
      updating the smart delegation contract recorded in the blockchain database to indicate that the smart delegation contract is marked as deleted for the tenant, and
      causing the second data center to revoke the second service for the tenant.

17. The non-transitory computer readable storage media of claim 13, wherein the identification of the first service is a public key from a first unique pair of cryptographic first private and first public keys associated with the first service, the identification of the second service is a second public key from a second unique pair of cryptographic second private and second public keys associated with the second service, and the identification of the tenant is the tenant public key.

18. The non-transitory computer readable storage media of claim 13, wherein the smart delegation contract further includes at least one of: a set of one or more first identifiers uniquely identifying a set of one or more sub-delegates to which the first service offer can be delegated by the tenant, a set of one or more second identifiers uniquely identifying a set of one or more sub-delegates to which the second service offer can be delegated by the tenant, one or more quotas specifying a maximum amount of attributes of the first service and the second service that can be consumed by the tenant, a set of one or more third identifiers that uniquely identify a set of one or more entities that are allowed to revoke the smart delegation contract set for the tenant, an expiration time indicating a time and date after which access of the tenant to the first service or the second service is no longer valid, and a time of issue indicating the time and date at which the smart delegation contract was generated for the tenant.

* * * * *